(12) United States Patent
Matsumoto

(10) Patent No.: US 7,258,791 B2
(45) Date of Patent: Aug. 21, 2007

(54) METHOD OF REDUCING VOLUME OF SLUDGE

(75) Inventor: Shigeki Matsumoto, Kanagawa (JP)

(73) Assignee: Takeshi Koga, Yokohama-Shi (JP)

( * ) Notice: Subject to any disclaimer, the term of this patent is extended or adjusted under 35 U.S.C. 154(b) by 1 day.

(21) Appl. No.: 11/069,063

(22) Filed: Mar. 2, 2005

(65) Prior Publication Data

US 2005/0199547 A1    Sep. 15, 2005

Related U.S. Application Data

(63) Continuation of application No. PCT/JP03/10732, filed on Aug. 26, 2003.

(30) Foreign Application Priority Data

Sep. 2, 2002  (JP) .............................. 2002-256721
May 26, 2003  (JP) .............................. 2003-147897

(51) Int. Cl.
    *C02F 3/00*   (2006.01)
(52) U.S. Cl. ....................... 210/607; 210/613; 210/626; 210/631
(58) Field of Classification Search ................ 210/607, 210/631, 613, 626
    See application file for complete search history.

(56) References Cited

U.S. PATENT DOCUMENTS 4,649,031 A * 3/1987 Matyas et al. ................ 423/20
5,369,031 A * 11/1994 Middleditch et al. ..... 435/262.5
5,417,862 A * 5/1995 Bergemann et al. ......... 210/626
5,540,847 A * 7/1996 Stultz et al. ................. 210/750
6,110,323 A * 8/2000 Marsland ..................... 162/14
6,224,769 B1 * 5/2001 Hasegawa et al. .......... 210/606
2004/0004038 A1 * 1/2004 Yamaguchi et al. ........ 210/623

FOREIGN PATENT DOCUMENTS

| DE | 129270 A | * | 1/1978 |
| JP | 55-8835 | | 1/1980 |
| JP | 8-39096 | | 2/1996 |
| JP | 9-136100 | | 5/1997 |
| JP | 10-80699 | | 3/1998 |
| JP | 11-300393 | | 11/1999 |
| JP | 2000-218295 | | 8/2000 |
| JP | 2001-79584 | | 3/2001 |
| JP | 2001-225091 | | 8/2001 |
| JP | 2003-117597 | | 4/2003 |

* cited by examiner

*Primary Examiner*—Chester T. Barry
(74) *Attorney, Agent, or Firm*—Kratz Quintos & Hanson, LLP

(57) ABSTRACT

The pH value of excess sludge taken out from a biological oxidation tank (2) is adjusted to 8 to 14, and the pH-adjusted sludge is injected into a solubilizing device (3). The sludge taken out from the solubilizing device (3) is heated to 110° C. to 350° C. at a pressure higher than saturated steam pressure to solubilize the sludge to a state readily degradable by microorganisms. The solubilized sludge is returned to a biological oxidizing tank (2), and the pH value of the sludge in the biological oxidizing tank (2) to 5 to 9. The use of the above method of treating excess sludge and an apparatus therefore enables substantially reducing the volume of excess sludge with economic advantage.

19 Claims, 12 Drawing Sheets

Time(min) Needed for 85% Solubilization of Sludge with Concentration of 10,000 mg/L

| Temperature | 110°C | 150°C | 200°C | 250°C | 300°C | 350°C |
|---|---|---|---|---|---|---|
| Pattern 1 | 150 | 90 | 60 | 40 | 25 | 15 |
| Pattern 2 | 80 | 40 | 13.5 | 10 | 6.5 | 3.5 |
| Pattern 3 | 27 | 12 | 4 | 1.5 | 0.5 | 0.15 |

Oxygen Consumption in case of Adding Solubilized
Sludge as BOD Source to Activated Sludge
Run 1:Solubilization with Heating and Alkali
Run 2:Solubilization with Heating Alkali and Pressurization Examples of Sludge Volume Reduction in each Pattern
Pattern 1:Heating Pulverization
Pattern 2:Heating Alkali Treatment
Pattern 3:Heating Alkali Pressurization Treatment

METHOD OF REDUCING VOLUME OF SLUDGE

This application is a continuation of international application PCT/JP03/10732 filed Aug. 26, 2003.

TECHNICAL FIELD

This invention relates to a method and an apparatus for completely removing or appreciably reducing the volume of sludge, generated by treatment of sewage water, by chemical or physical techniques.

BACKGROUND ART

Excess sludge generated from the installations for purifying sewage water from a sewage works or a domestic septic tank, by biological treatment, is first dewatered and usually used for landfill or incinerated as industrial wastes. Recently, it has become necessary to introduce a large-scale drying device, in order to combat the problem of shortage of landfill site or of the probability of dioxin generation ascribable to the lowering of the temperature of the combusting furnace at the time of the incineration, thus posing the problem of high cost.

For biologically reducing the volume of excess sludge, there has so far been known an aerobic or anaerobic method consisting in employing aerobic or anaerobic microorganisms. However, the method of anaerobic digestion has a defect that the digestion time is prolonged and the digestion rate is low and hence the method is currently not used extensively.

There is disclosed in Patent Publication 1 a method for reducing the volume of sludge by first dissolving sludge by alkali addition and heating and subsequently subjecting the resulting mass to an aerobic biological treatment method. There is also disclosed in Patent Publication 2 a method for reducing the volume of sludge by heating and pressurizing sludge, solubilizing the resulting mass on pulverization and subjecting the resulting mass to aerobic biological treatment. There is furthermore disclosed in Patent Publication 3 a method for reducing the volume of sludge by solubilizing the sludge under subcritical conditions and subsequently subjecting the resulting mass to aerobic biological treatment. In any of these methods, it is necessary to completely solubilize and lower the molecular weight of the cell wall of sludge, as a substance difficultly degradable by microorganisms, if the solubilized sludge is to be metabolically decomposed by the aerobic biological treatment method. Notwithstanding, the sludge is not solubilized sufficiently with the method disclosed in Patent Publication 1 or 2, with the consequence that the sludge can be reduced in volume only slightly. On the other hand, with the method disclosed in Patent Publication 3, since the biodegradation-resistant substances are yielded by the vapor phase reaction under an elevated temperature, the solubilized sludge is poor in metabolic degradation performance, with the result that the time needed for metabolic degradation is protracted, thus raising the cost.

[Patent Publication 1] JP Patent Kokoku JP-B-49-11813

[Patent Publication 2] JP Patent Kokai JP-A-2000-354896

[Patent Publication 3] JP Patent Kokai JP-A-2000-218285

DISCLOSURE OF THE INVENTION

1. Problem to be Solved by the Invention

It is therefore an object of the present invention to provide a technique for solubilizing sludge consisting in completely solubilizing and lowering the molecular weight of cell walls, biodegradation-resistant substances of a sludge, in a shorter time. It is a more specific object of the present invention to provide a method and a device for reducing the volume of an organic sludge by 100%.

2. Means to Solve the Problem

The present invention provides a method for reducing the volume of sludge comprising taking out at least a fraction of re-converted sludge from a biological oxidizing tank, configured for degrading extracted sludge by aerobic treatment; adjusting the pH of the so taken out re-converted sludge to 8 to 14; heating the pH-adjusted re-converted sludge to 110° C. to 350° C. at a pressure higher than saturated steam pressure to solubilize the sludge to a state readily degradable by microorganisms; and returning a preset amount of the solubilized re-converted sludge into the biological oxidizing tank in connection with adjusting the pH of the sludge in the biological oxidizing tank to 5 to 9.

With a method for reducing the volume of sludge, according to the present invention, the extracted sludge, adjusted to a pH of 8 to 14, may be heated to 110° C. to 350° C. at a pressure higher than saturated steam pressure to solubilize the sludge to a state readily degradable by microorganisms, a preset amount of the solubilized extracted sludge may then be injected into a biological oxidizing tank, configured for degrading the extracted sludge by aerobic treatment, and the pH of the sludge in the biological oxidizing tank may then be adjusted to 5 to 9.

With a method for reducing the volume of sludge, according to the present invention, the extracted sludge, adjusted to a pH of 8 to 14, may be heated to 110° C. to 350° C. at a pressure higher than saturated steam pressure to solubilize the sludge to a state readily degradable by microorganisms, and a preset amount of the solubilized extracted sludge may then be injected into a biological oxidizing tank, configured for degrading the extracted sludge by aerobic treatment. The pH of the sludge in the biological oxidizing tank is then adjusted to 5 to 9, at least a fraction of the re-converted sludge is then taken out from the biological oxidizing tank, and the extracted re-converted sludge is then returned to the step of adjusting the pH of the sludge to 8 to 14.

With a method for reducing the volume of sludge, according to the present invention, the extracted sludge, adjusted to a pH of 8 to 14, may be heated to 110° C. to 350° C. at a pressure higher than saturated steam pressure to solubilize the sludge to a state readily degradable by microorganisms, and a preset amount of the solubilized extracted sludge may then be injected into a first biological oxidizing tank, configured for degrading the extracted sludge by aerobic treatment. The pH of the sludge in the first biological oxidizing tank is then adjusted to 5 to 9, and at least a fraction of the re-converted sludge is taken out from the first biological oxidizing tank. The so taken out re-converted sludge is then injected into a second biological oxidizing tank, configured for degrading the re-converted sludge by aerobic treatment. At least a fraction of re-re-converted sludge is then taken out from the second biological oxidizing tank, and the pH of the extracted re-re-converted sludge is adjusted to 8 to 14. The pH-adjusted re-re-converted sludge is then heated to 110° C. to 350° C. at a pressure higher than saturated steam pressure to solubilize the sludge to a state readily degradable by microorganisms. A preset amount of the solubilized re-re-converted sludge is then returned into the second biological oxidizing tank, and the pH of the sludge in the second biological oxidizing tank is adjusted to 5 to 9.

With a method for reducing the volume of sludge, according to the present invention, the extracted sludge, adjusted to a pH of 8 to 14, may be heated to 110° C. to 350° C. at a pressure higher than saturated steam pressure to solubilize the sludge to a state readily degradable by microorganisms. A preset amount of the solubilized extracted sludge is then injected into a biological oxidizing tank, configured for degrading the extracted sludge by aerobic treatment, and the pH of the sludge in the biological oxidizing tank is then adjusted to 5 to 9. At least a fraction of the re-converted sludge is then taken out from the biological oxidizing tank to adjust the pH of the so taken out re-converted sludge to 8 to 14. The pH-adjusted re-converted sludge is then heated to 110° C. to 350° C. at a pressure higher than saturated steam pressure to solubilize the sludge to a state readily degradable by microorganisms. A preset amount of the solubilized re-converted sludge is then returned into the biological oxidizing tank, and the pH of the sludge in the biological oxidizing tank is then adjusted to 5 to 9.

With a method for reducing the volume of sludge, according to the present invention, the extracted sludge, adjusted to a pH of 8 to 14, may be heated to 110° C. to 350° C. at a pressure higher than saturated steam pressure to solubilize the sludge to a state readily degradable by microorganisms. A preset amount of the solubilized extracted sludge is then injected into a first biological oxidizing tank, configured for degrading the extracted sludge by aerobic treatment, and the pH of the sludge in the first biological oxidizing tank is adjusted to 5 to 9. At least a fraction of re-converted sludge is then taken out from the first biological oxidizing tank, and the pH of the so taken out re-converted sludge is then adjusted to 8 to 14. The pH-adjusted re-converted sludge is then heated to 110° C. to 350° C. at a pressure higher than saturated steam pressure to solubilize the sludge to a state readily degradable by microorganisms. A pre-set amount of the solubilized re-converted sludge is then injected into a second biological oxidizing tank, configured for degrading the re-converted sludge by aerobic treatment, and the pH of the sludge in the second biological oxidizing tank is then adjusted to 5 to 9. At least a fraction of re-re-converted sludge then is taken out from the second biological oxidizing tank, and the so taken out re-re-converted sludge is returned to the step of adjusting the pH of the re-converted sludge to 8 to 14.

With a method for reducing the volume of sludge, according to the present invention, at least a fraction of sludge as extracted sludge may be taken out from a sewage water treatment device, configured for degrading organic sewage water by a biological treatment, and the pH of the so taken out extracted sludge may then be adjusted to 8 to 14. The pH-adjusted extracted sludge is then heated to 110° C. to 350° C. at a pressure higher than saturated steam pressure to solubilize the sludge to a state readily degradable by microorganisms. A preset amount of the solubilized extracted sludge is then injected into a biological oxidizing tank, configured for degrading the extracted sludge by aerobic treatment, and the pH of the sludge in the biological oxidizing tank is then adjusted to 5 to 9. At least a fraction of re-converted sludge is taken out from the biological oxidizing tank, and the so taken out re-converted sludge is returned to the sewage water treatment device.

With a method for reducing the volume of sludge, according to the present invention, at least a fraction of sludge may be taken out as extracted sludge from a sewage water treatment device, configured for degrading organic sewage water and solubilized extracted sludge by biological treatment, and the pH of the so taken out extracted sludge may be adjusted to 8 to 14. The pH-adjusted extracted sludge is then heated to 110° C. to 350° C. at a pressure higher than saturated steam pressure to solubilize the sludge to a state readily degradable by microorganisms. A preset amount of the solubilized extracted sludge is then returned to the sewage water treatment device, and the pH of the sludge in the sewage water treatment device is then adjusted to 5 to 9.

With a method for reducing the volume of sludge, according to the present invention, at least a fraction of sludge may be taken out as extracted sludge from a sewage water treatment device 1, configured for degrading organic sewage water by a biological treatment, and the pH of the so taken out extracted sludge may then be adjusted to 8 to 14. The pH-adjusted extracted sludge is then heated to 110° C. to 350° C. at a pressure higher than saturated steam pressure, to solubilize the sludge to a state readily degradable by microorganisms. A preset amount of the solubilized extracted sludge is then injected into a sewage water treatment device 2, configured for degrading organic sewage water and solubilized extracted sludge by biological treatment, and the pH in the sewage water treatment device 2 is then adjusted to 5 to 9. At least a fraction of sludge is then taken out as extracted sludge from the sewage water treatment device 2 and the so taken out extracted sludge is returned to the step of adjusting the pH of the extracted sludge to 8 to 14.

With a method for reducing the volume of sludge, according to the present invention, at least a fraction of sludge is taken out as extracted sludge from a sewage water treatment device 1, configured for degrading organic sewage water by biological treatment, and the so taken out extracted sludge is then injected into a sewage water treatment device 2, configured for degrading the organic sewage water and solubilized extracted sludge by biological treatment. At least a fraction of sludge as extracted sludge is taken out from the sewage water treatment device 2, and the pH of the so taken out extracted sludge is adjusted to 8 to 14. The pH-adjusted extracted sludge is then heated to 110° C. to 350° C. at a pressure higher than saturated steam pressure to solubilize the sludge to a state readily degradable by microorganisms. A preset amount of the solubilized extracted sludge is then returned to the sewage water treatment device 2, and the pH of the sludge in the sewage water treatment device is then adjusted to 5 to 9.

In any of the above methods, the solubilized extracted sludge, re-converted sludge or the re-re-converted sludge may be returned or injected into an anaerobic treatment device, configured for degrading the solubilized extracted sludge, re-converted sludge or re-re-converted sludge by anaerobic treatment, or into an intermittent aerating tank alternately carrying out aerobic treatment and anaerobic treatment, instead of into the biological oxidizing tank, the first biological oxidizing tank, the second biological oxidizing tank, the sewage water treatment device or the sewage water treatment device 2.

In any of the above methods, the solubilized extracted sludge, re-converted sludge or re-re-converted sludge, adjusted to a pH of 8 to 14, may be heated to 110° C. to 350° C. at a saturated steam pressure, instead of being heated to 110° C. to 350° C. to a pressure higher than the saturated steam pressure.

In any of the above methods, phosphorus and/or nitrogen may be removed from the solubilized extracted sludge, re-converted sludge or re-re-converted sludge.

In any of the above methods, the adjustment of pH of from 8 to 14 may be by addition of alkali.

In any of the above methods, the alkali may be sodium hydroxide.

In any of the above methods, the solid content in the solubilized extracted sludge, re-converted sludge or re-re-converted sludge is separated before return or injection into the biological oxidizing tank, the first biological oxidizing tank, the second biological oxidizing tank, the sewage water treatment device or into the sewage water treatment device 2, so that only liquid content is returned or injected.

In any of the above methods, the separated solid content may be returned to the step of solubilizing the extracted sludge, re-converted sludge or re-re-converted sludge, adjusted to the pH of 8 to 14, to the state readily degradable by microorganisms by heating to 110° C. to 350° C. at a pressure higher than saturated steam pressure.

In any of the above methods, the mixed liquor suspended solids (MSLL) of the extracted sludge, re-converted sludge or re-re-converted sludge, may be adjusted to 10000 mg/L to 120000 mg/L by a sludge condensing device or a sludge dewatering device.

In any of the above methods, at least a fraction of the solubilized extracted sludge, re-converted sludge or re-re-converted sludge, is allowed to outflow as an efflux.

In any of the above methods, the solubilized extracted sludge, re-converted sludge or re-re-converted sludge, may be treated by an oxidizing agent or by a photocatalyst, and/or by a flocculant for flocculation/precipitation. At least a fraction of the solubilized sludge, treated with acid or flocculated/precipitated, may be allowed to outflow directly as an effluent.

In any of the above methods, at least a fraction of the solubilized extracted sludge, re-converted sludge or re-re-converted sludge, may be taken out and the pH of the so taken out sludge may then be adjusted to 8 to 14. The pH-adjusted sludge is then heated to 110° C. to 350° C. at a pressure higher than the saturated steam pressure, as the sludge is solubilized by ultrasonic treatment to a state readily degradable by microorganisms. A preset amount of the solubilized re-converted sludge or re-re-converted sludge is then returned to the biological oxidizing tank, first biological oxidizing tank, second biological oxidizing tank, sewage water treatment device, anaerobic treatment device or to the intermittent aerating tank, as the pH of the sludge in the tank or device is adjusted to 5 to 9.

With a sludge volume reducing method, according to the present invention, the extracted sludge, adjusted to a pH of 8 to 14, may be heated to 110° C. to 350° C. at a pressure higher than the saturated steam pressure, to solubilize the sludge to a state readily degradable by microorganisms, and a preset amount of the solubilized extracted sludge may then be injected into a biological oxidizing tank, configured for degrading the extracted sludge by aerobic treatment. The pH of the sludge in the biological oxidizing tank is then adjusted to 5 to 9. At least a fraction of the re-converted sludge is then taken out from the biological oxidizing tank, and the so taken out re-converted sludge is then injected into an anaerobic treatment tank configured for degrading the so taken out re-converted sludge by anaerobic treatment. At least a fraction of re-re-converted sludge is then taken out from the anaerobic treatment tank, and the so taken out re-re-converted sludge is returned into the biological oxidizing tank.

The present invention also provides an apparatus for reducing the volume of sludge comprising a biological oxidizing tank for degrading extracted sludge by aerobic treatment; a solubilizing device for solubilizing re-converted sludge, taken out from the biological oxidizing tank, to a state readily degradable by microorganisms; means for adjusting the pH of the re-converted sludge, taken out from the biological oxidizing tank, to 8 to 14; means for injecting the pH-adjusted re-converted sludge into the solubilizing device; means for heating the sludge in the solubilizing device to 110° C. to 350° C. at a pressure higher than saturated steam pressure; and means for returning the re-converted sludge, taken out in solubilized state from the solubilizing device, to the biological oxidizing tank, and for adjusting the pH of the sludge in the biological oxidizing tank to 5 to 9.

With an apparatus for reducing the volume of sludge, according to the present invention, there may be provided means for adjusting the pH of the extracted sludge to 8 to 14; a solubilizing device for solubilizing the pH-adjusted extracted sludge to a state readily degradable by microorganisms; means for heating sludge in the solubilizing device to 110° C. to 350° C. at a pressure higher than saturated steam pressure; a biological oxidizing tank for degrading the extracted sludge by aerobic treatment; means for injecting the solubilized extracted sludge, taken out from the solubilizing device, into the biological oxidizing tank; and for adjusting the pH of the sludge in the biological oxidizing tank to 5 to 9.

With an apparatus for reducing the volume of sludge, according to the present invention, there may be provided means for adjusting the pH of the extracted sludge to 8 to 14; a solubilizing device for solubilizing the pH-adjusted extracted sludge to a state readily degradable by microorganisms; means for heating sludge in the solubilizing device to 110° C. to 350° C. at a pressure higher than saturated steam pressure; a biological oxidizing tank for degrading the extracted sludge by aerobic treatment; means for injecting the solubilized extracted sludge, taken out from the solubilizing device, into the biological oxidizing tank; and for adjusting the pH of the sludge in the biological oxidizing tank to 5 to 9, and means for returning the re-converted sludge, taken out from the biological oxidizing tank, to the means for adjusting the re-converted sludge, extracted from the biological oxidizing tank, to pH of 8 to 14.

With an apparatus for reducing the volume of sludge, according to the present invention, there may be provided means for adjusting the pH of extracted sludge to 8 to 14; a first solubilizing device for solubilizing the pH-adjusted extracted sludge to a state readily degradable by microorganisms; means for heating sludge in the first solubilizing device to 110° C. to 350° C. at a pressure higher than saturated steam pressure; a first biological oxidizing tank for degrading the extracted sludge by aerobic treatment; means for injecting the solubilized extracted sludge, taken out from the first solubilizing device, into the first biological oxidizing tank, and for adjusting the pH of the sludge in the first biological oxidizing tank to 5 to 9; a second biological oxidizing tank for degrading re-converted sludge by aerobic treatment; means for injecting the re-converted sludge, extracted from the first biological oxidizing tank, into the second biological oxidizing tank; means for adjusting re-re-converted sludge, taken out from the second biological oxidizing tank, to 8 to 14; a second solubilizing device for solubilizing the pH-adjusted re-re-converted sludge to a state readily degradable by microorganisms; means for heating sludge in the second solubilizing device to 110° C.

to 350° C. at a pressure higher than saturated steam pressure; and means for returning the solubilized re-re-converted sludge, extracted from the second solubilizing device, to the second biological oxidizing tank and for adjusting the pH of the sludge in the second biological oxidizing tank to 5 to 9.

With an apparatus for reducing the volume of sludge, according to the present invention, there may be provided means for adjusting the pH of extracted sludge to 8 to 14; a first solubilizing device for solubilizing the pH-adjusted extracted sludge to a state readily degradable by microorganisms; means for heating sludge in the first solubilizing device to 110° C. to 350° C. at a pressure higher than saturated steam pressure; a biological oxidizing tank for degrading the extracted sludge by aerobic treatment, means for injecting the solubilized extracted sludge, taken out from the first solubilizing device, into the biological oxidizing tank, and for adjusting the pH of the sludge in the biological oxidizing tank to 5 to 9; means for adjusting the pH of the re-converted sludge, taken out from the biological oxidizing tank, to 8 to 14; a second solubilizing device for solubilizing the pH-adjusted re-converted sludge to a state readily degradable by microorganisms; means for heating the sludge in the second solubilizing device to 110° C. to 350° C. at a pressure higher than saturated steam pressure; and means for returning the solubilized re-converted sludge, taken out from the second solubilizing device, to the biological oxidizing tank, and for adjusting the pH in the sludge in the biological oxidizing tank to 5 to 9.

With an apparatus for reducing the volume of sludge, according to the present invention, there may be provided means for adjusting the pH of extracted sludge to 8 to 14; a first solubilizing device for solubilizing the pH-adjusted extracted sludge to a state readily degradable by microorganisms; means for heating sludge in the first solubilizing device to 110° C. to 350° C. at a pressure higher than saturated steam pressure; a first biological oxidizing tank for degrading the extracted sludge by aerobic treatment; means for injecting the solubilized extracted sludge, taken out from the first solubilizing device, into the first biological oxidizing tank, and for adjusting the pH of the sludge in the first biological oxidizing tank to 5 to 9; means for adjusting the pH of re-converted sludge, taken out from the first biological oxidizing tank, to 8 to 14; a second solubilizing device for solubilizing the pH-adjusted re-converted sludge to a state readily degradable by microorganisms; means for heating the sludge in the second solubilizing device to 110° C. to 350° C. at a pressure higher than saturated steam pressure; a second biological oxidizing tank for degrading the re-converted sludge by aerobic treatment, means for injecting the solubilized re-converted sludge, extracted from the second solubilizing device, into the second biological oxidizing tank, and for adjusting the pH of the sludge in the second biological oxidizing tank to 5 to 9; and means for returning re-re-converted sludge, taken out from the second biological oxidizing tank, into the means for adjusting the pH of the re-converted sludge to 8 to 14.

With an apparatus for reducing the volume of sludge, according to the present invention, there may be provided a sewage water treatment device for decomposing organic sewage water by biological treatment; a solubilizing device for solubilizing the extracted sludge, taken out from the sewage water treatment device, to a state readily degradable with microorganisms; means for adjusting the pH of the extracted sludge, taken out from the sewage water treatment device, to 8 to 14; means for heating the sludge in the solubilizing device to 110° C. to 350° C. at a pressure higher than saturated steam pressure; a biological oxidizing tank for degrading the extracted sludge by aerobic treatment; means for injecting the solubilized extracted sludge, taken out from the solubilizing device, into the second biological oxidizing tank, and for adjusting the pH of the sludge in the biological oxidizing tank to 5 to 9; and means for returning re-converted sludge, taken out from the biological oxidizing tank, into the sewage water treatment device.

With an apparatus for reducing the volume of sludge, according to the present invention, there may be provided a sewage water treatment device for decomposing organic sewage water and solubilized extracted sludge by biological treatment; a solubilizing device for solubilizing the extracted sludge, taken out from the sewage water treatment device, to a state readily degradable with microorganisms; means for adjusting the pH of the extracted sludge, taken out from the sewage water treatment device, to 8 to 14; means for heating the sludge in the solubilizing device to 110° C. to 350° C. at a pressure higher than saturated steam pressure; and means for returning the solubilized extracted sludge, taken out from the solubilizing device, back to the sewage water treatment device, and for adjusting the pH of the sludge of the sewage water treatment device to 5 to 9.

With an apparatus for reducing the volume of sludge, according to the present invention, there may be provided a sewage water treatment device 1 for decomposing organic sewage water by biological treatment; a solubilizing device for solubilizing the extracted sludge, taken out from the sewage water treatment device 1, to a state readily degradable with microorganisms; means for adjusting the pH of the extracted sludge, taken out from the sewage water treatment device 1, to 8 to 14; means for heating the sludge in the solubilizing device to 110° C. to 350° C. at a pressure higher than saturated steam pressure; a sewage water treatment device 2 for decomposing organic sewage water and solubilized extracted sludge by biological treatment; means for injecting the solubilized extracted sludge, taken out from the solubilizing device, into the sewage water treatment device 2, and for adjusting the pH of the sludge in the sewage water treatment device 2 to 5 to 9; and means for returning extracted sludge, taken out from the sewage water treatment device 2, into the means for adjusting the pH of the extracted sludge to 8 to 14.

With an apparatus for reducing the volume of sludge, according to the present invention, there may be provided a sewage water treatment device 1 for decomposing organic sewage water by biological treatment; a sewage water treatment device 2 for decomposing organic sewage water and solubilized extracted sludge by biological treatment; means for injecting extracted sludge taken out from the sewage water treatment device 1 into the sewage water treatment device 2; a solubilizing device for solubilizing the extracted sludge taken out from the sewage water treatment device 2 to a state degradable by microorganisms; means for adjusting the pH of the extracted sludge taken out from the sewage water treatment device 2 to 8 to 14; means for heating the sludge in the solubilizing device to 110° C. to 350° C. at a pressure higher than the saturated steam pressure; and means for returning the solubilized extracted sludge, taken out from the solubilizing device, to the sewage water treatment device 2, and for adjusting the pH in the sewage water treatment device 2 to 5 to 9.

In any of the above apparatus, there is provided, in place of at least one of the biological oxidizing tank, first biological oxidizing tank, second biological oxidizing tank, sewage water treatment device and the sewage water treatment device 2, to which the solubilized extracted sludge, taken out from the solubilizing device, re-converted sludge or re-reconverted sludge is returned or injected, an anaerobic treatment device for degrading the solubilized extracted sludge, re-converted sludge or re-re-converted sludge by anaerobic treatment device, or an intermittent aerating tank for alternately carrying out aerobic treatment and anaerobic treatment.

In any of the above apparatus, there are provided, in place of the means for adjusting the pH of the extracted sludge, re-converted sludge or re-re-converted sludge to 8 to 14 and the means for heating the sludge in the solubilizing device at 110° C. to 350° C. at a pressure higher than the saturated steam pressure, means for adjusting the pH of the extracted sludge, re-converted sludge or re-re-converted sludge to 8 to 14, and means for heating the sludge in the solubilizing device at 110° C. to 350° C. at a pressure equal to saturated steam pressure.

In any of the above apparatus, there may be provided at least one of a dephosphorization device for removing phosphorus from the solubilized extracted sludge, re-converted sludge or re-re-converted sludge, a denitrification device for removing nitrogen from the solubilized extracted sludge, re-converted sludge or re-re-converted sludge, an oxidizing device for treating the solubilized extracted sludge, re-converted sludge or re-re-converted sludge with an oxidizing agent or a photocatalyst, and a flocculation precipitation device.

In any of the above apparatus, at least one of the dephosphorization device for removing phosphorus, denitrification device for removing nitrogen, oxidizing device and the flocculation precipitation device is subordinate to the solubilizing device, the first solubilizing device or to the second solubilizing device.

In any of the above apparatus, the solubilizing device, the first solubilizing device or the second solubilizing device is subordinate to at least one of the biological oxidizing tank, first biological oxidizing tank and the second biological oxidizing tank.

In any of the above apparatus, the means for adjusting pH to 8 to 14 may be by alkali addition.

In the above apparatus, the alkali may be sodium hydroxide.

In any of the above apparatus, there may be provided means for separating solid content in the solubilized extracted sludge, re-converted sludge or re-re-converted sludge prior to return or injection into the biological oxidizing tank, first biological oxidizing tank, second biological oxidizing tank, sewage water treatment device or the sewage water treatment device 2 to return or inject only liquid content.

In any of the above apparatus, there may be provided means for returning the separated solid content to the means for heating the sludge in the solubilizing device, the first solubilizing device or the second solubilizing device to 110° C. to 350° C. at a pressure higher than the saturated steam pressure.

In any of the above apparatus, there may be provided a sludge condensing device or a sludge dewatering device for adjusting the mixed liquor suspended solids (MLSS) of sludge to 10000 mg/L to 120000 mg/L The present invention also provides an apparatus for reducing the volume of sludge comprising one of a biological oxidizing tank, a first biological oxidizing tank, a second biological oxidizing tank, a sewage water treatment device, an anaerobic treatment device and an intermittent aerating tank for degrading extracted sludge, re-converted sludge or re-re-converted sludge by aerobic treatment; a solubilizing device for solubilizing the sludge taken out from the tank or device to a state readily degradable by microorganisms; means for adjusting the pH of the sludge taken out from the tank or device to 8 to 14; means for injecting the pH-adjusted sludge into the solubilizing device; means for heating the sludge in the solubilizing device to 110° C. to 350° C. at a pressure higher than the saturated steam pressure; an ultrasonic treatment device for applying ultrasonic waves to the sludge in the solubilizing device; and means for returning the solubilized sludge taken out from the solubilizing device to the tank or device and for adjusting the pH of the sludge in the tank or device to 5 to 9.

An apparatus for reducing the volume of sludge according to the present invention may comprise means for adjusting the pH of extracted sludge to 8 to 14; a solubilizing device for solubilizing the pH-adjusted extracted sludge to a state readily degradable by microorganisms; means for heating the sludge in the solubilizing device to 110° C. to 350° C. at a pressure higher than the saturated steam pressure; a biological oxidizing tank for degrading a preset amount of the solubilized extracted sludge by aerobic treatment; means for adjusting the pH of the sludge in the biological oxidizing tank to 5 to 9; means for taking out at least a fraction of the re-converted sludge from the biological oxidizing tank; an anaerobic treatment tank for degrading the re-converted sludge taken out by anaerobic treatment; and means for taking out at least a fraction of re-re-converted sludge from the anaerobic treatment tank to return the so taken out re-re-converted sludge into the biological oxidizing tank.

The 'excess sludge' denotes redundant microorganisms, newly generated in the treatment of sewage water, metabolically degrading the organic matter by biological treatment. The excess sludge needs to be removed because these microorganisms, if increased in excess quantities, render it difficult to separate the solid content and the liquid content of the mixed liquid sludge from each other. The 'extracted sludge' denotes sludge extracted from the sewage water treatment device to outside the treatment system, and may include excess sludge. The 're-converted sludge' denotes sludge generated in the course of biological treatment of solubilized extracted sludge and may include the extracted sludge. The 're-re-converted sludge' denotes sludge generated in the course of biological treatment of solubilized re-converted sludge and may include the re-converted sludge. The 'microorganisms' denote all microorganisms that may be in operation in degrading the organic matter by biological treatment. For biological treatment of general organic sewage water, aerobic microorganisms are used. These aerobic microorganisms may be enumerated by bacteria, such as *Alcaligenes, Bacillus, Escherichia, Flavobacterium, Pseudomonous* or *Zoogloea*, and minor quantities of Protozoa, such as filamentous fungi, Ciliata or Rotatoria. Examples of the microorganisms, used in the method of the present invention, may include, in addition to the above common microorganisms, other aerobes, facultative anaerobes and anaerobes. Specifically, these may include yeast, ascomycetes, and cellulolytic bacteria, mainly comprising aerobes, proteolytic bacteria, lactic acid bacteria and grass bacillus, mainly comprising facultative anaerobes, photosynthetic bacteria, nitrogen fixing bacteria, acetic acid bacteria or lactic acid bacteria, mainly comprising anaerobes.

The 'biological oxidizing tank' is a tank for metabolically degrading the solubilized sludge by aerobic biological treatment. The biological oxidizing tank does not include a first biological oxidizing tank nor a second biological oxidizing tank.

The 'anaerobic treatment device' is a device for metabolically degrading the solubilized sludge by anaerobic biological treatment.

The 'aerobic treatment' mainly means metabolically degrading the organic matter using aerobes and does not prescribe specified techniques, it being only sufficient if aerobes are used. The 'anaerobic treatment' mainly means metabolically degrading the organic matter using anaerobes and does not prescribe specified techniques, it being only sufficient if anaerobes are used. The 'sewage water treatment device' means a device for biologically metabolically degrading organic sewage water and may include crude sewage water tanks, aerating tanks and solid-liquid separating devices. The sewage water treatment device does not include a sewage water treatment device 1 nor a sewage water treatment device 2.

The expression 'solubilizing sludge to a state readily degradable by microorganisms' primarily denotes that the substance forming the sludge, in particular the substance making up the cell wall, is solubilized and lowered in molecular weight to such an extent that the solubilized sludge may readily pass through the cell membrane of microorganisms. It is, however, not mandatory that the sludge be solubilized and lowered in molecular weight completely.

The 'solubilizing device' means a device for heating the pH-adjusted sludge to a state readily degradable by microorganisms, by heating method provided in the solubilizing device, and may include a pressurizing device for maintaining the pressure to the sludge in the solubilizing device at higher than saturated steam pressure. The solubilizing device does not include a first solubilizing device nor a second solubilizing device.

The 'heating' means maintaining the temperature within a range of 110° C. to 350° C. and may include temperature variations in the up-and-down direction.

The 'solid content' means floating substances and/or solids included in extracted sludge, re-converted sludge or re-re-converted sludge, solubilized by solubilizing treatment. The 'liquid content' means the extracted sludge, re-converted sludge or re-re-converted sludge, solubilized by solubilizing treatment, freed of the solid content.

The 'oxidizing agent' denotes a chemical oxidizing agent, as used for degrading biodegradation-resistant substances or chemical oxidants used as deodorants, and may be enumerated by, for example, hydrogen peroxide, chlorine, hypochlorous acid, persulfate ions, per carbonates and ozone. The 'photocatalyst' denotes a catalyst activated by sunbeams or light radiated from a fluorescent lamp to yield superoxide anions or hydroxyl radicals, and may be exemplified by e.g. titanium oxide ($TiO_2$). The photocatalyst used may be formed by titanium oxide or a composite material, including titanium oxide, carried on the surface of a carrier composed of metals, ceramics or mixtures thereof. Preferably, titanium oxide may be deposited as a coating layer on the carrier surface. Although there is no limitation to the shape of the carrier, a coating of titanium oxide is preferably formed on the surface of a spherically-shaped particle in order to increase a surface area acting as a catalyst layer. A column charged with this catalyst is prepared and irradiated with UV rays, using a UV lamp, as the liquefied sludge is passed therethrough. The particle coated with titanium oxide may be prepared by a number of methods known in the art. Examples of these methods include a sol-gel method, a binder method, and a blasting method.

The 'flocculant' may be an inorganic flocculant or a high molecular weight flocculant, and may be used for removing biodegradation-resistant materials. The inorganic flocculants may be classified into aluminum salt based flocculants and iron salt based flocculants. The former type flocculants may be exemplified by aluminum sulfate, sodium aluminate, magnesium aluminate and aluminum polychloride. The latter type flocculants may be exemplified by ferrous sulfate, ferric sulfate, iron polysulfate and ferric chloride. Alum, calcium hydroxide or flyash may also be used. The high molecular weight flocculant may be exemplified by sodium alginate, CMC tetrium, sodium polyacrylate, polyacrylic acid amide partial hydrolyzate, and maleic acid co-polymer. These may be used either alone or in combination.

The expression that the solubilizing device, first solubilizing device or the second solubilizing device is subordinate to the biological oxidizing tank, first biological oxidizing tank, second biological oxidizing tank, dephosphorizing device or to the denitrification device means that the solubilizing devices are not provided with own pumps or the like units and may be in operation in dependence upon the pumps or the like devices provided to these tanks or devices.

The expression that the solubilized sludge is returned or injected into the biological oxidizing tank, first biological oxidizing tank, second biological oxidizing tank, sewage treatment device, sewage treatment device 2 or into the anaerobic treatment device, as the pH of the sludge in the biological oxidizing tank, first biological oxidizing tank, second biological oxidizing tank, sewage treatment device, sewage treatment device 2 or in the anaerobic treatment device is adjusted to 5 to 9, means that the pH of the sludge in the biological oxidizing tank, first biological oxidizing tank, second biological oxidizing tank, sewage treatment device, sewage treatment device 2 or in the anaerobic treatment device may be adjusted by adding acid thereto before, after or during injection or return of the solubilized sludge into the biological oxidizing tank, first biological oxidizing tank, second biological oxidizing tank, sewage treatment device, sewage treatment device 2.

The temperature necessary for solubilizing the sludge, adjusted to the pH of 8 to 14, by heating and pressurization, to a state readily degradable by microorganisms, is preferably 110° C. to 350° C., more preferably 110° C. to 300° C., more preferably 110° C. to 250° C., more preferably 110° C. to 190° C. and most preferably 110° C. to 149° C. The pressure is preferably higher than saturated steam pressure.

3. Meritorious Effect of the Invention

With the method and apparatus of the present invention, in which the pH of the extracted sludge is adjusted to 8 to 14, the sludge is heated to 110° C. to 350° C. at a pressure higher than the saturated steam pressure and thereby solubilized to a state readily degradable by microorganisms, the pH of the solubilized sludge is adjusted to 5 to 9 and the resulting sludge is degraded by aerobic treatment in the biological oxidizing tank, the sludge may be diminished in volume without producing undegraded residues economically.

More specifically, in order for the microorganisms, making up the sludge in the biological oxidizing tank, to metabolically degrade the solubilized extracted sludge, the solubilized sludge needs to be sufficiently solubilized and lowered in molecular weight to to pass through the cell wall of the microorganisms. However, with the solubilizing treatment by the physico-chemical techniques, already proposed, the percentage of the extracted sludge sufficiently solubilized and lowered in molecular weight is low, with the result that the percentage of the solubilized extracted sludge passing readily through the cell wall of the microorganisms is also low. The extracted sludge, not sufficiently solubilized and lowered in molecular weight, and hence unable to pass through the cell wall of the microorganisms and unable to be degraded metabolically, is gradually solubilized and lowered in molecular weight, only at an extremely low rate, such that many days, for example several months, of treatment are needed, thus detracting from economic profitability. If the treatment for solubilizing the extracted sludge is continued from day to day in such a state the extracted sludge not sufficiently solubilized and reduced in molecular weight is left over, the sludge not sufficiently solubilized and reduced in molecular weight is left over in the biological oxidizing tank in a volume increasing with lapse of time. As a result, the proportion of the microorganisms in the biological oxidizing tank is decreased and the activity thereof is lost and finally it becomes impossible to metabolically degrade the solubilized extracted sludge by microorganisms. Nonetheless, in the method and apparatus for reducing the sludge volume, according to the present invention, the extracted sludge is sufficiently solubilized and reduced in molecular weight to such an extent that the sludge is able to pass readily through the cell wall of the microorganisms and able to be degraded by the microorganisms, after which the solubilized sludge is transferred to the biological oxidizing tank where the solubilized sludge is efficiently metabolically degraded by microorganisms making up the sludge. Thus, the sludge may be reduced in volume highly efficiently with economic profitability, safety and compactness of the apparatus. The sludge volume reducing effect is stable, there is no limitation to the type of the extracted sludge, and organic matter in the crude sewage water may be present in the undegraded state in the extracted sludge. In addition, the maintenance of the sludge volume reducing apparatus according to the present invention is easy, with the running cost of the apparatus being appreciably low as compared to that of other physico-chemical techniques.

Moreover, with the present sludge volume reducing apparatus, the sludge is heated at a pressure higher than the saturated steam pressure, and hence the ion product of water can be prohibited from being lowered, with the result that the hydrolysis, in the liquid phase reaction, can be carried out highly efficiently such that the organic matter can be solubilized by 100%. In case heating is carried out at the saturated steam pressure, the liquid phase reaction and the vapor phase reaction proceed simultaneously. Thus, the sludge solubilized and reduced in molecular weight is re-combined and increased in molecular weight with the vapor phase reaction to generate substances difficultly degradable with microorganisms. Hence, the rate of solubilization is low. Moreover, since the sludge contains substances difficultly degradable with microorganisms, the metabolic degradation by microorganisms making up the sludge is extremely time-consuming.

With the method and apparatus according to the present invention, in case the pH is adjusted to 8 to 14 and the sludge is pressurized at a pressure higher than saturated steam pressure, the temperature necessary for solubilizing the sludge to a state readily degradable by microorganisms, from the aspect of costs, is preferably 110° C. to 350° C., more preferably 110° C. to 300° C., more preferably 110° C. to 250° C., more preferably 110° C. to 190° C. and most preferably 110° C. to 149° C.

If, in the method and apparatus according to the present invention, the concentration of the sludge injected into the biological oxidizing tank or into the solubilizing device is adjusted by providing a sludge condensing device or by a sludge dewatering device, the biological oxidizing tank or the solubilizing device may be reduced in capacity, while the initial cost may be lowered. The initial cost and the running cost for pH adjustment may also be lowered.

If, in the method and apparatus according to the present invention, the phosphorus or nitrogen in the sludge is removed by providing a dephosphorizing device or a denitrification device, it is possible to prevent the quality of the treated sewage water from being lowered, thereby reducing costs. More specifically, efflux of phosphorus or nitrogen is conductive to eutrophication of aqueous environments of rivers or lakes to destruct the environment. Consequently, the standard of emission of phosphorus or nitrogen is becoming rigorous from year to year such that suitable measures must be taken to reduce the level of emission of phosphorus or nitrogen. So far, a method comprising dissipating nitrogen as nitrogen gas into atmosphere by biological denitrification has been in use. However, this method depends on biological metabolism and hence it is necessary to set conditions, such as temperature or concentration of dissolved oxygen, and to provide a large-sized denitrification tank. Moreover, since it is necessary to add a large quantity of methanol as hydrogen donor needed for the denitrification reaction, the cost is prohibitively high. With the sludge volume reducing method, according to the present invention, solubilized sludge may be used as hydrogen donor in case of removing nitrogen contained in the solubilized sludge in the course of the sludge volume reducing process. Additionally, since the solubilized sludge is condensed appreciably, there is no necessity for providing a large denitrification layer for the denitrification reaction, with the result that denitrification can be effected highly economically. As for phosphorus, the conventional practice has been to discharge phosphorus out of the system as waste along with excess sludge by taking advantage of the properties of phosphorus of being adsorbed to the sludge, or to elute phosphorus from the sludge under anaerobic conditions and removed it by chemical techniques. On the other hand, with the sludge volume reducing method of the present invention, flocculants, such as lime or iron-based flocculants, or aluminum-based flocculants, may be used for the sludge solubilized in the course of the sludge volume reducing process, in order to remove phosphorus, with the result that dephosphorization may be effected highly economically.

Figure 1:
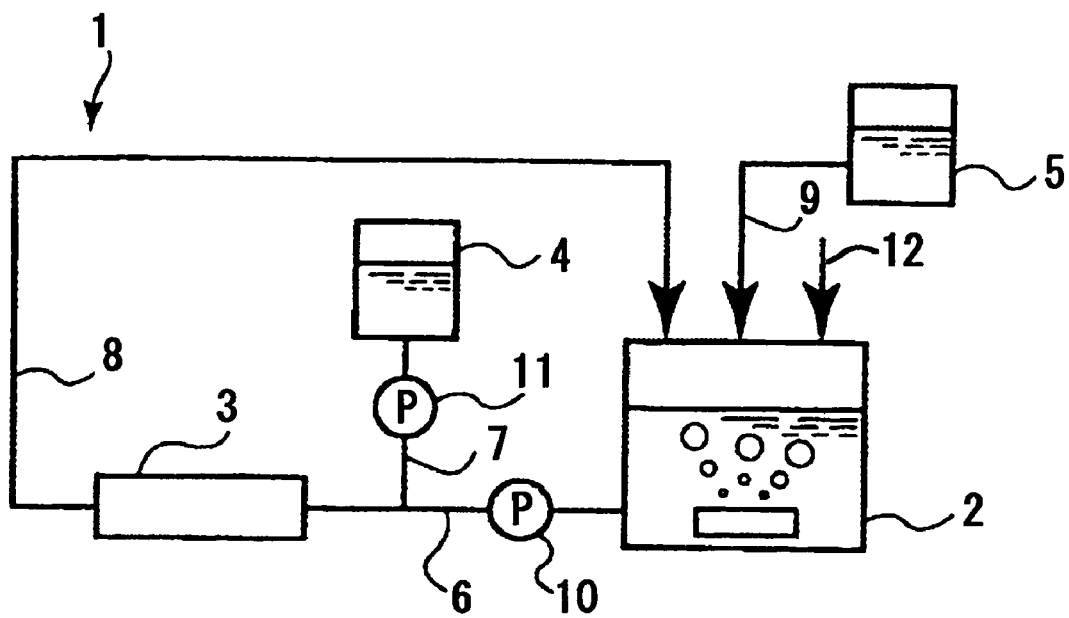
FIG. 1 is a schematic view of an apparatus for reducing the volume of sludge according to a first embodiment of the present invention.

EXPLANATION OF NUMERALS 1 apparatus for reducing the volume of sludge
2 tank for biological oxidization
3 solubilizing device
4 alkali supply device
5 acid supply device
6 sludge supply line
7 alkali supply line
8 liquefied sludge injection line
9 acid supply line
10, 11 pumps
12 sewage water injection line

BEST MODE FOR CARRYING OUT THE INVENTION

Referring to FIGS. 1 to 4, the method for reducing the volume of sludge according to the present invention is explained in detail.

FIG. 1 is a schematic view of an apparatus for reducing the volume of sludge according to an embodiment of the present invention. The apparatus 1 for reducing the volume of sludge includes a tank 2 for biological oxidization, configured for decomposing solubilized sludge by aerobic treatment, a hermetically sealed solubilizing device 3 for solubilizing the sludge to a state readily degradable by microorganisms, a sludge supply line 6 for extracting excess sludge injected into the tank 2 for biological oxidization into the solubilizing device 3, a pump 10 provided in the sludge supply line 6, an alkali supply device 4, an alkali supply line 7 for adding alkali from the alkali supply device 4 to the sludge extracted from the tank 2 for biological oxidization, a pump 11 provided on the alkali supply line 7, and a liquefied sludge injection line 8 for returning the sludge in the solubilizing device 3, solubilized to the state readily degradable with microorganisms, to the tank 2 for biological oxidization. The apparatus for reducing the volume of sludge further includes an acid supply device 5, and an acid supply line 9 for adding acid from the acid supply device 5 to the tank 2 for biological oxidization. The excess sludge, injected into the tank 2 for biological oxidization, is taken out via sludge supply line 6 from the tank 2 for biological oxidization into the solubilizing device 3. The pump 11 then is actuated to add alkali via alkali supply line 7 to the sludge taken out into the solubilizing device 3. The sludge is heated in the solubilizing device 3 at a pressure higher than the saturated steam temperature so as to be solubilized and made available as a BOD source. The sludge taken out into the solubilizing device 3 is preferably adjusted to a pH of 8 to 14 by the pump 11 provided to the alkali supply line 7. The heating in the solubilizing device 3 is preferably carried out at 110° C. to 350° C. The sludge in the solubilizing device is solubilized and rendered available as a BOD source by the catalytic action of the alkali added. Thus, the present invention contemplates reducing the volume of sludge by returning the sludge, solubilized by the catalytic action of the alkali, into the tank for biological oxidization, as a BOD source.

The apparatus 1 for reducing the volume of sludge, shown in FIG. 1, may be provided with a device for reducing the volume of sludge by condensing excess sludge to adjust the MLSS of sludge, not shown, or with a sludge dewatering device, also not shown. In this case, the MLSS of sludge injected into the tank for biological oxidization may preferably be adjusted to 10000 mg/L to 120000 mg/L, and hence the excess sludge may be decomposed more efficiently by aerobic treatment. Moreover, since the sludge injected into the tank for biological oxidization may be made higher in concentration, the tank for biological oxidization may be reduced in size. Since the solubilizing device also may be reduced in size, the cost for heating may be reduced. Additionally, the amounts of the alkali and the acid, added to the solubilizing device and to the tank for biological oxidization, may be reduced, thus giving rise to favorable results to the environment and to economic merits.

If, in FIG. 1, the pH of the solubilized sludge is close to neutral, or the inside of the tank for biological oxidization is acidic, there is no necessity of providing the acid supply device 5 used for adding acid to the solubilized sludge to adjust the pH of the sludge. In this case, the sludge may be processed more simply, more promptly and more economically.

Moreover, since the sludge is pressurized in the solubilizing device 3 to a pressure higher than the saturated steam pressure, it is possible to suppress the vapor phase reaction, to promote the liquid phase reaction and to suppress generation of biodegradation-resistant substances or turning into oil owing to thermal degradation. Since the rate of chemical reaction is improved by acquisition of thermal energy, ascribable to increase in temperature, treatment may be completed in a short time. Moreover, since the ionic product of water may be prevented from being decreased by pressurizing the sludge to a pressure higher than the saturated steam pressure, the reaction of hydrolysis may be carried out more efficiently.

The apparatus 1 for reducing the volume of sludge in FIG. 1 may be provided at least with one of a denitrification device and a dephosphorization device. By liquefying the sludge, nitrogen and phosphorus in the sludge may be removed more efficiently than with the conventional system, so that sludge treatment may be more benign to environment. The nitrogen removing method is varied with the state of nitrogen. For example, if nitrogen existing as ammonia is to be removed, an ammonia stripping method comprising aerating the drainage or a sludge (mixed liquid) after raising its pH and allowing nitrogen to be dissipated as ammonia gas into a vapor phase, for removal subsequently, has so far been widely used in case ammonia is present to a high concentration in the drainage treatment process. If a denitrification device is provided in the apparatus for reducing the volume of sludge, according to the present invention, nitrogen present as ammonia may be removed by adding alkali to the sludge to adjust the pH and by aerating liquefied sludge prior to neutralization to effect thermal degradation.

In addition, nitrogen inherently present in an existing processing device may also be removed. In removing nitrogen present as nitric acid or nitrous acid, most of nitrogen present in the drainage treatment process is converted into nitrogen as nitric acid, through nitrogen as nitrous acid, in the course of the aerobic biological treatment process. The major removing method for this form of nitrogen is the biological denitrification method, according to which nitrogen may be removed by a reducing action of nitrogen removing bacteria under anaerobic conditions by a route of nitric acid→nitrous acid→nitrogen gas which is dissipated into atmosphere. However, a sufficient quantity of hydrogen donors is required for the progress of this biological reaction. Usually, methanol is used as a hydrogen donor. In case a denitrification device is provided in the apparatus for reducing the volume of sludge of the present invention, liquefied sludge may be used as a hydrogen donor, and hence the cost of methanol needed for nitrogen removal may be reduced. The result is that the cost for removing nitrogen as nitric acid or as nitrous acid, generated in the course of reducing the volume of sludge by liquefying treatment, as well as nitrogen as nitric acid or as nitrous acid, generated inherently in a pre-existing treatment device, may be reduced. On the other hand, it has been known that, in removing phosphorus, phosphorus in drainage displays a fundamental behavior of becoming adsorbed to and eluted from flocculated sludge under aerobic and anaerobic conditions, respectively. Thus, the conventional main dephosphorizing method comprises using a lime-, aluminum- or iron-based flocculant to cause phosphorus, eluted under anaerobic conditions, to be precipitated as insoluble precipitates, which are then removed. In particular, the adsorbing power of phosphorus is improved appreciably in case the sludge is in the phosphorus depleted state under an anaerobic condition as pre-treatment. If conversely the apparatus for reducing the volume of sludge according to the present invention is provided with a dephosphorizing device, sludge is liquefied, so that phosphorus in the sludge is eluted, and hence the complicated treatment, such as anaerobic treatment or aerobic treatment, may be dispensed with. In addition, the phosphorus in the sludge, which is not eluted with the anaerobic treatment or aerobic treatment, is eluted, with the result that phosphorus generated in the course of the sludge volume reducing process by liquefying treatment or the phosphorus generated in pre-existing drainage treatment equipment may be removed highly efficiently. In FIG. 1, the solubilizing device 3 may be subordinate to the dephosphorizing device or to the denitrification device by solubilizing device 3 co-owning e.g. the pump with the dephosphorizing device or the denitrification device.

Figure 2:
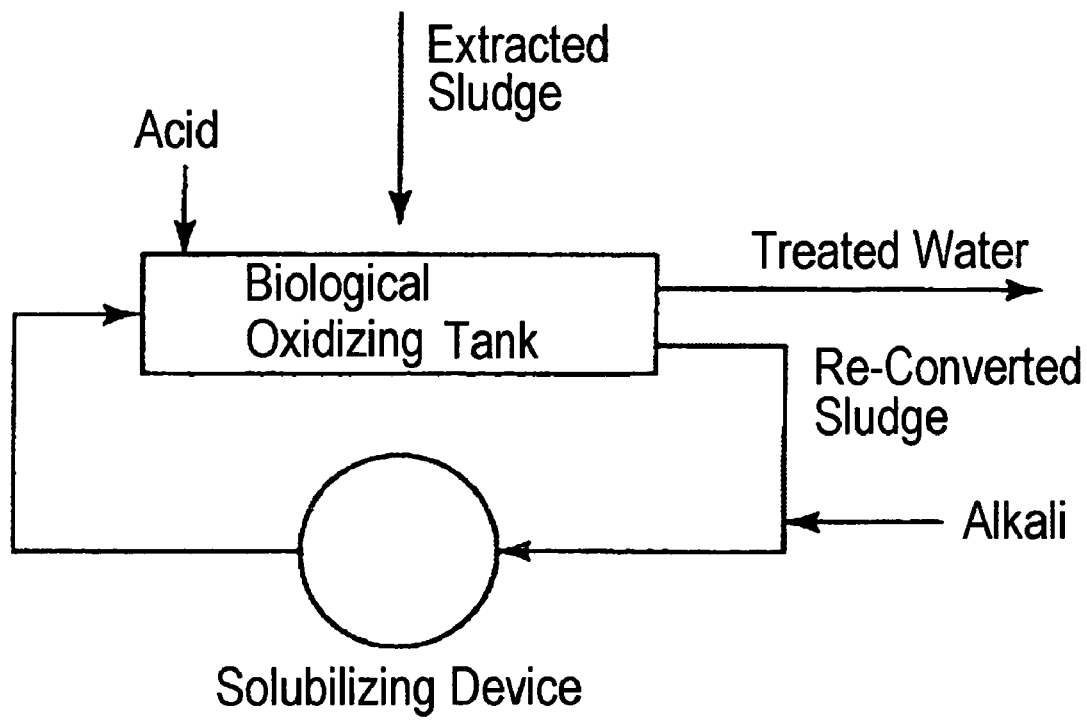
FIG. 2 shows a schematic structure of the apparatus for reducing the volume of sludge according to the first embodiment of the present invention.

FIG. 2 shows a schematic structure of the sludge volume reducing apparatus 1 shown in FIG. 1. FIGS. 3 to 11, 16 and 17 show other schematic structures of the sludge volume reducing apparatus 1 according to the present invention. In these embodiments, the sludge volume reducing apparatus 1 may again be provided with a sludge condensing device or a sludge dewatering device, not shown, for condensing the extracted sludge, the re-converted sludge or the re-re-converted sludge to adjust the MLSS of the sludge. Since the MLSS of the sludge, injected into the solubilizing device, biological oxidizing tank, anaerobic treatment device or into a treatment device can be adjusted readily, the sludge can be decomposed more efficiently. On the other hand, the sludge may be condensed and hence the biological oxidizing tank or a liquefying device may be reduced in size. Consequently, the cost for heating may be lowered and that for chemicals needed may also be lowered, with the result that sludge treatment may be more benign to environment with marked economical advantages.

The biological oxidizing tank, anaerobic treatment device or the treatment device is provided with a solid-liquid separating device, not shown, for solid-liquid separating the sludge. Thus, the sludge (mixed liquid) in the tank or devices is separated into transparent supernatant and sludge. The supernatant is treated e.g. for disinfection and allowed to outflow as an effluent. There may further be provided with a conversion device for converting e.g. methane, yielded in the aforementioned anaerobic treatment device, into thermal or electrical energy. This allows recovery of energy resources from an organic drainage or the aforementioned extracted sludge. This method converts the organic matter into methane or carbon dioxide by the action of anaerobic organisms, and is termed methane fermentation. It is said that microorganisms of two different eco-systems are taking part in methane fermentation. Initially, sugar, protein, nucleic acid and lipids are decomposed by anaerobic or facultative anaerobes (such as *Bacillus, Clostridium* or *Staphylococcus*) to yield lower fatty acids or carbon dioxide. Methane is then yielded by the action of absolute anaerobic methane generating bacteria. The methane generating bacteria, used for methane fermentation, may be enumerated by, for example, *Methanobacterium, Methanococcus* and *Methanosarcina*.

In FIGS. 2 to 11, 16 and 17, addition of acid into the biological oxidizing tank, anaerobic treatment device or the drainage treatment device may be carried out before, after or in the course of injection or return of the solubilized sludge into the tank or devices, or directly into the solubilized sludge. In case the pH of the sludge in the biological oxidizing tank, anaerobic treatment device or the drainage treatment device, after injection or return of the solubilized sludge, ranges from 5 to 9, acid addition may be omitted, in which case sludge may be treated more readily, promptly and economically.

The extracted sludge, re-converted sludge or re-re-converted sludge from the biological oxidizing tank, anaerobic treatment device or the drainage treatment device may be injected or returned into any line other than the line shown in the drawing, or into any device or tank of the sludge volume reducing apparatus. The liquefied sludge, extracted from the solubilizing device, may similarly be injected or returned into any line other than the line shown in the drawing, or into any device or tank of the sludge volume reducing device.

Moreover, in FIGS. 2 to 11, 16 and 17, the sludge volume reducing apparatus may be provided with at least one of the denitrification device and the dephosphorizing device. These devices may also be subordinate to the solubilizing device.

Figure 16:
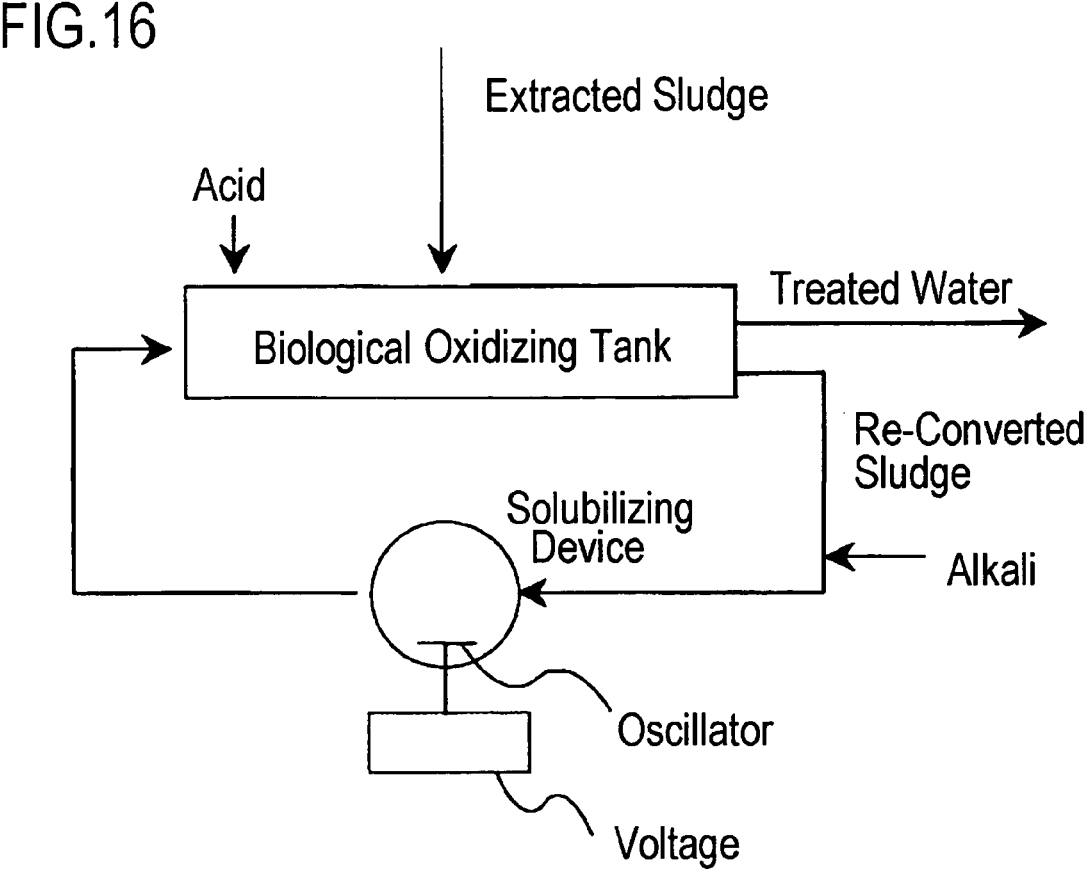
FIG. 16 shows a schematic structure of a further embodiment of the present invention.
Figure 17:
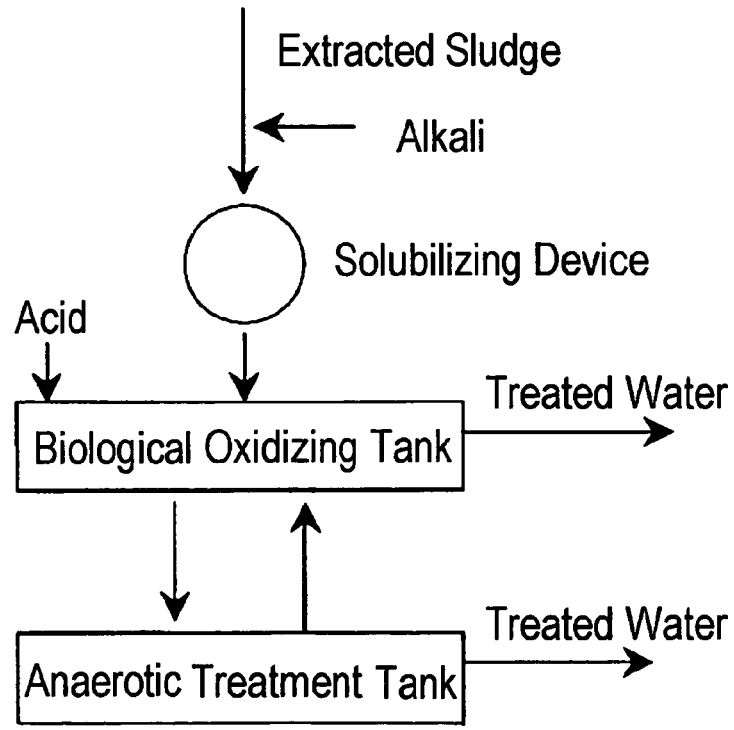
FIG. 17 shows a schematic structure of yet another embodiment of the present invention.

Referring to FIGS. 16 and 17, other modifications of the present invention are explained. The sludge volume reducing device, shown in FIG. 16, includes, in addition to the device shown in FIG. 2, an ultrasonic treatment device, designed for further promoting the solubilization and modification of sludge, in the inside of the solubilizing device. This ultrasonic treatment device includes, for example, an oscillator for ultrasonic treatment, and a power supply for applying the voltage to the oscillator. It is sufficient that the oscillator generates ultrasonic waves of the frequency of 10 to 3000 kHz, preferably 10 to 200 kHz, with the sound wave intensity being of the order of 0.05 to 5.0 W/cm2 and preferably 0.1 to 1.5 W/cm2. The oscillator may be of various shapes, such as a horn shape or a shape of an oscillating plate. As a concrete treatment method, ultrasonic waves may be continuously or intermittently applied to the sludge kept in circulation within the modifying tank. Such ultrasonic treatment operates in addition to the catalytic action of the alkali under elevated temperature and pressure in the solubilizing device to promote sludge solubilization. That is, the organic matter, decomposed only insufficiently by the alkali treatment, is turned into a material of low molecular weight, with destruction of e.g. cell membranes of the microorganisms in the sludge, thus improving biological degradation further.

Figure 3:
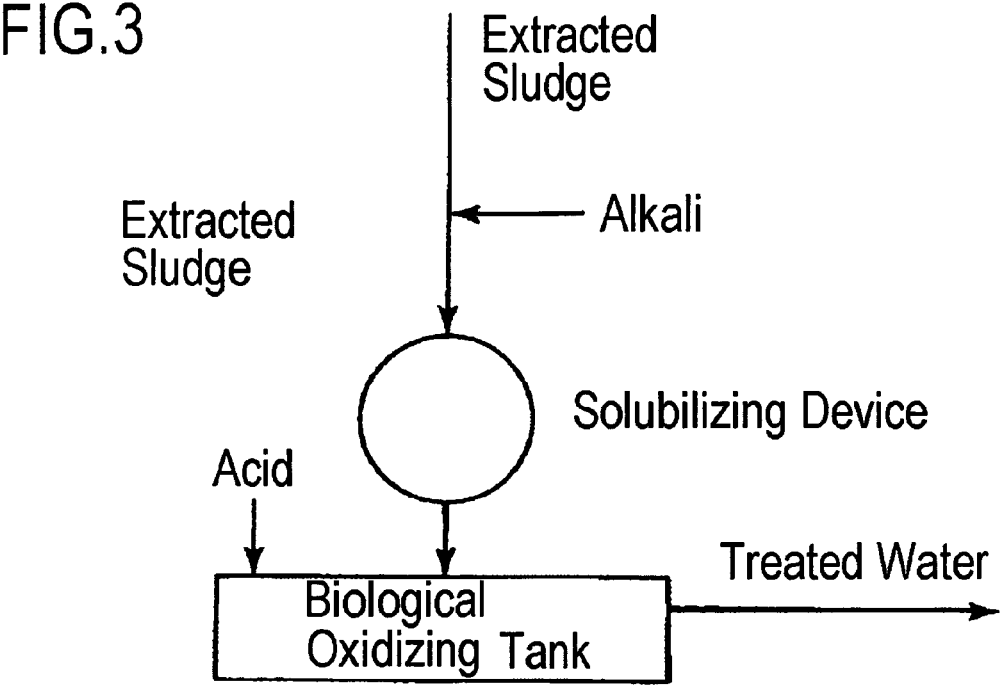
FIG. 3 shows a schematic structure of another embodiment of the present invention.

In addition to the device components, shown in FIG. 3, an anaerobic treatment tank is provided to the sludge volume reducing apparatus shown in FIG. 17. The biological oxidizing tank and the anaerobic treatment tank, shown in FIG. 17, are provided with a line for reciprocal circulation of the sludge contained in the tanks. In the biological oxidizing tank, aerobic treatment may be carried out as air is supplied thereto. In this case, anaerobic treatment may desirably be carried out under interruption of air supply to the anaerobic treatment tank. Alternatively, the aerobic treatment and anaerobic treatment may be carried out in the respective opposite tanks. It may be conjectured that, as the solubilized sludge is circulated between the two tanks, the biological oxidizing reactions by different metabolic enzymatic systems proceed alternately to accelerate degradation of solubilized sludge, that is, the rate of BOD lowering is promoted.

Alternatively, aerobic treatment and anaerobic treatment may be carried out alternately at a preset time interval, within the same biological oxidizing tank of the device shown in FIG. 3 (intermittent aerating tank). By adjusting the amounts of air supplied for intermittent aeration, it is possible to optimize the proportions of the aerobes, facultative anaerobes and anaerobes in the bacteria in the biological oxidizing tank. As the bacteria for efficient degradation of the solubilized sludge, the proportions of ca. 60 to 80% of aerobes, ca. 20 to 10% of facultative anaerobes and ca. 20 to 10% of anaerobes, are most effective.

Figure 4:
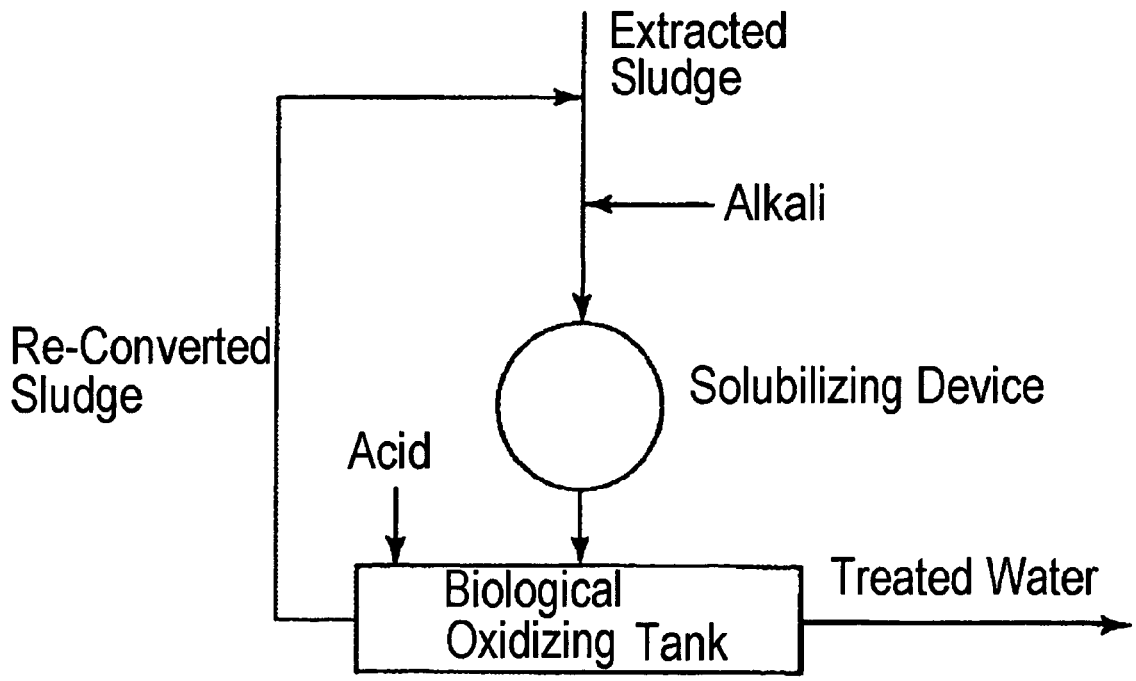
FIG. 4 shows a schematic structure of still another embodiment of the present invention.
Figure 5:
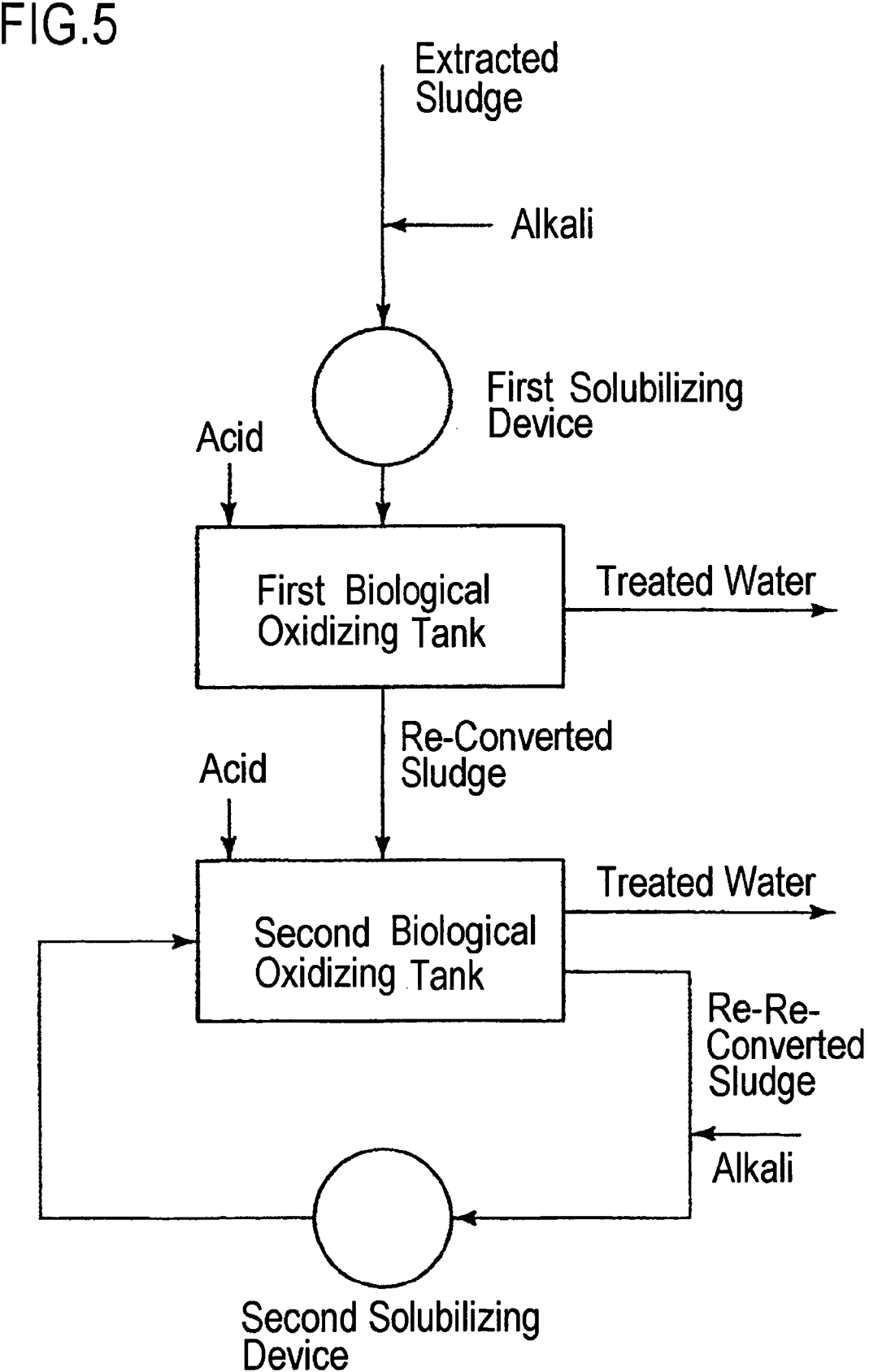
FIG. 5 shows a schematic structure of a further embodiment of the present invention.
Figure 6:
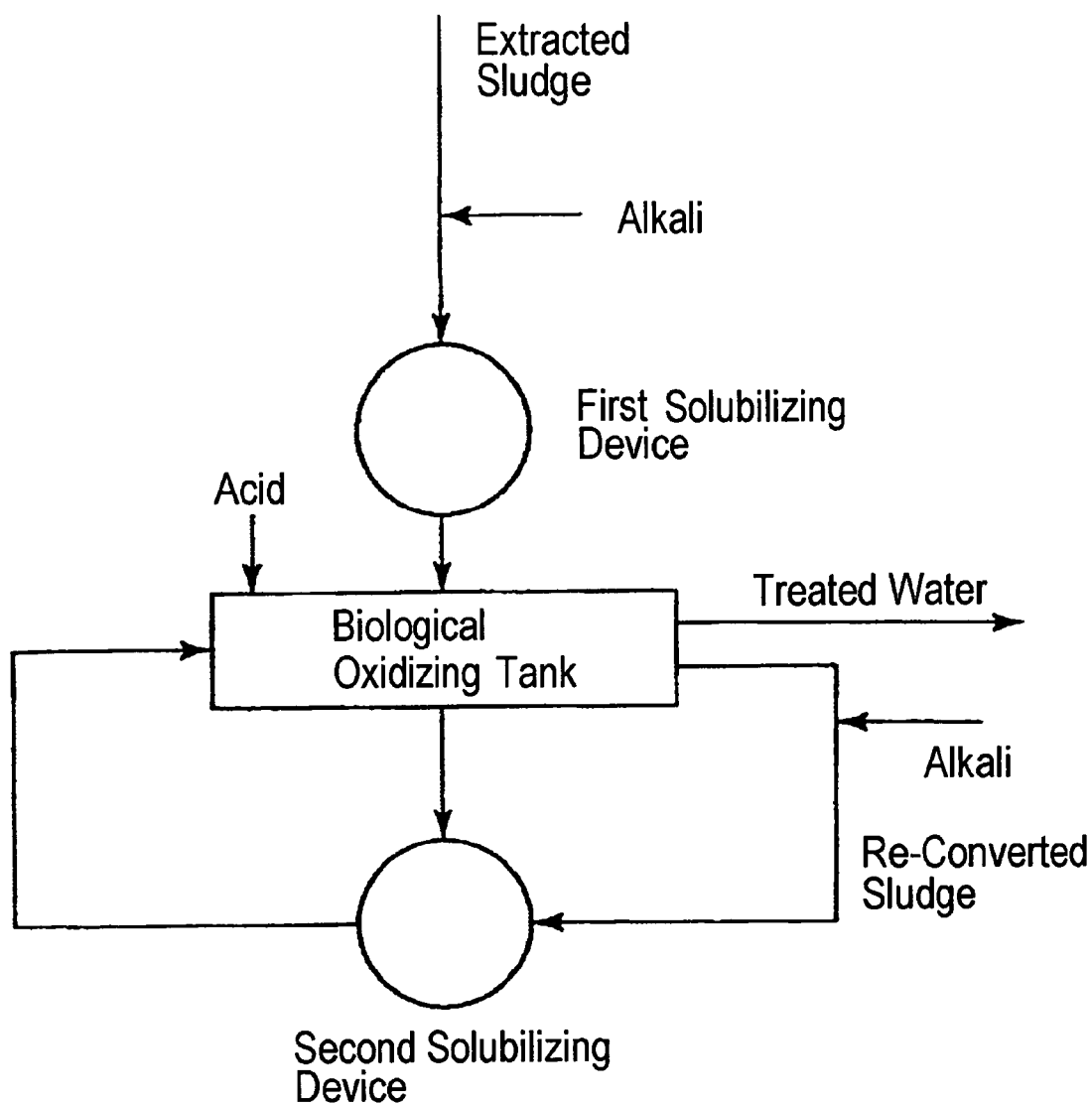
FIG. 6 shows a schematic structure of a further embodiment of the present invention.
Figure 7:
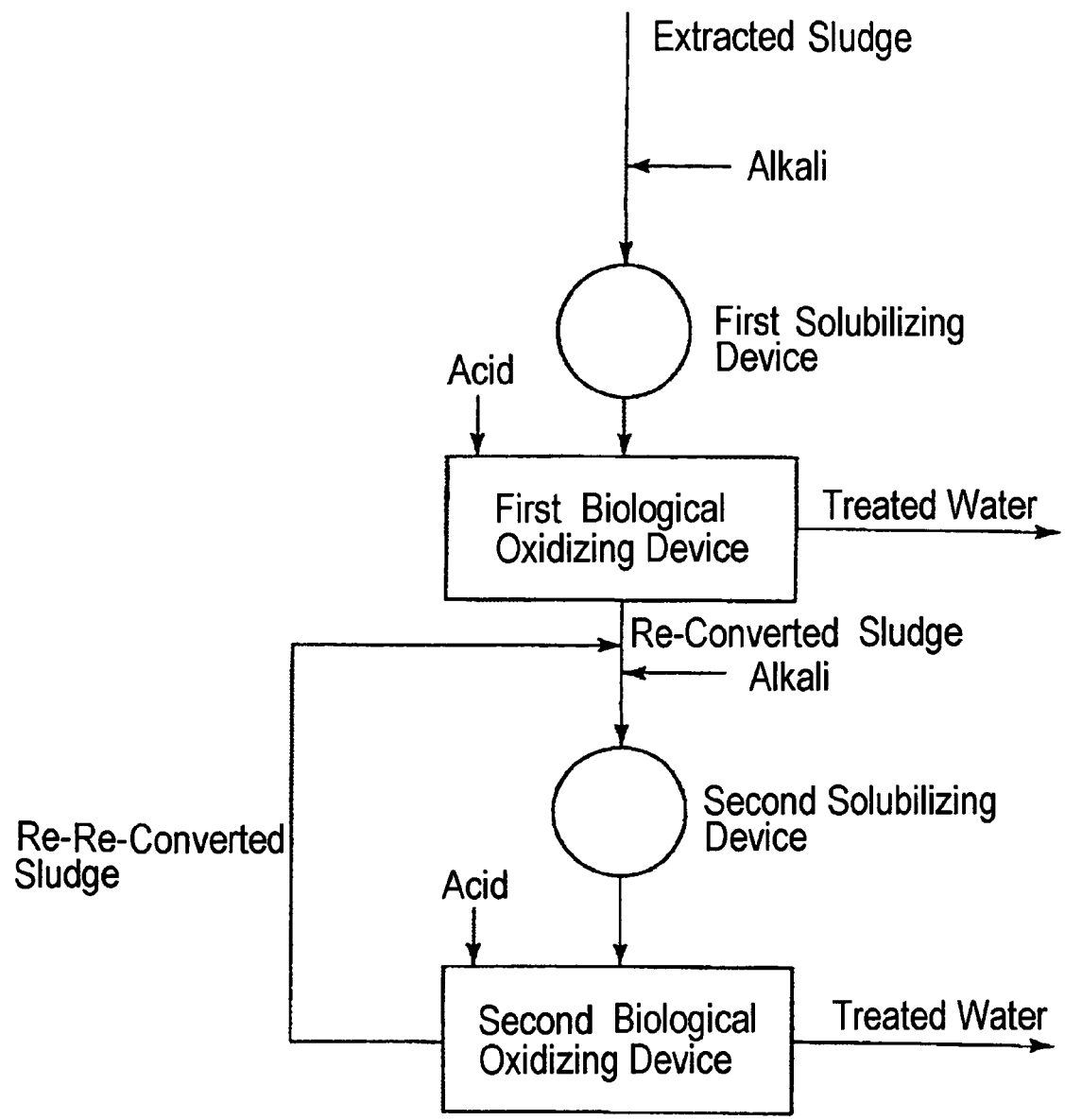
FIG. 7 shows a schematic structure of a further embodiment of the present invention.
Figure 8:
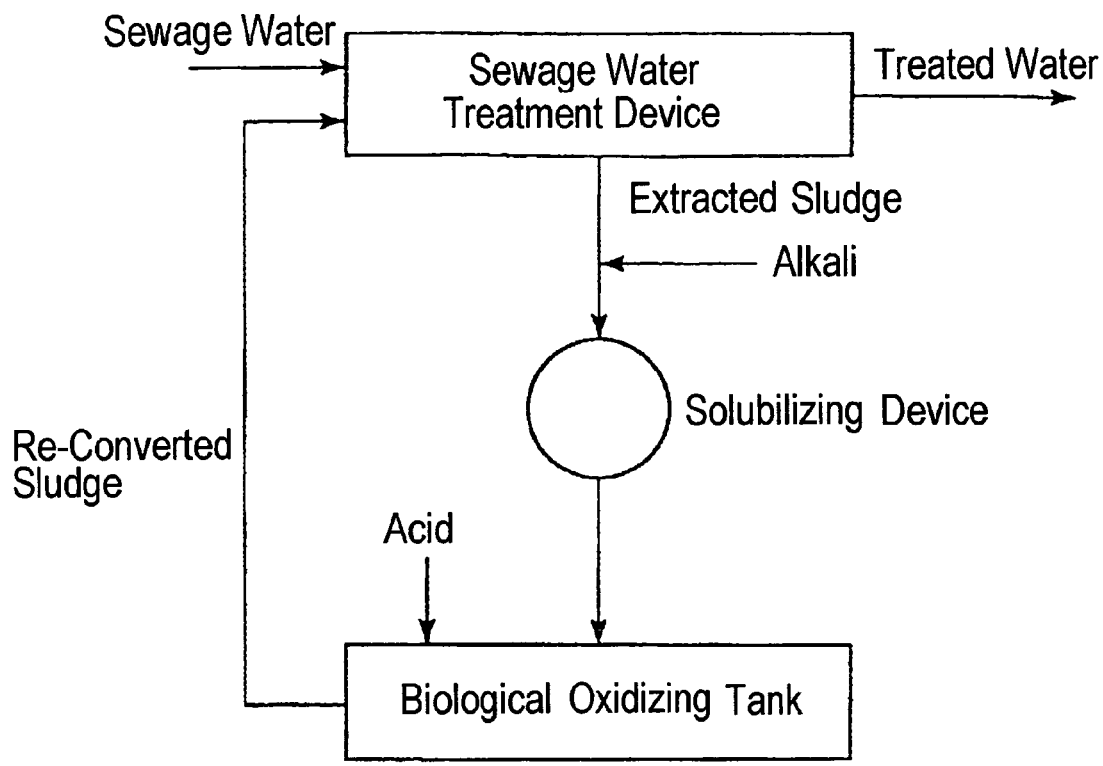
FIG. 8 shows a schematic structure of a further embodiment of the present invention.
Figure 9:
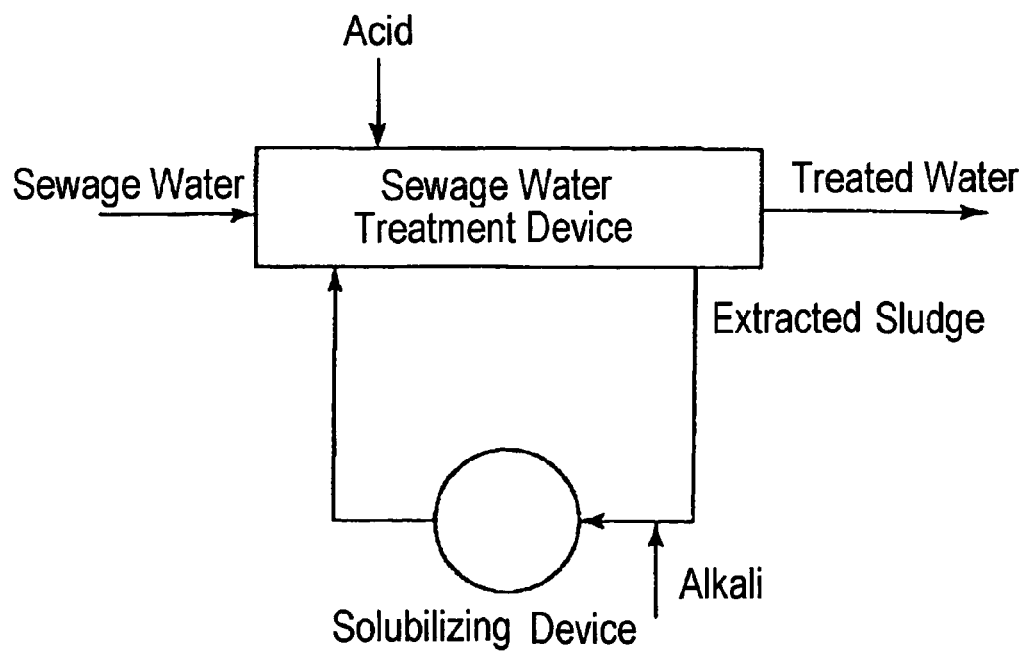
FIG. 9 shows a schematic structure of a further embodiment of the present invention.
Figure 10:
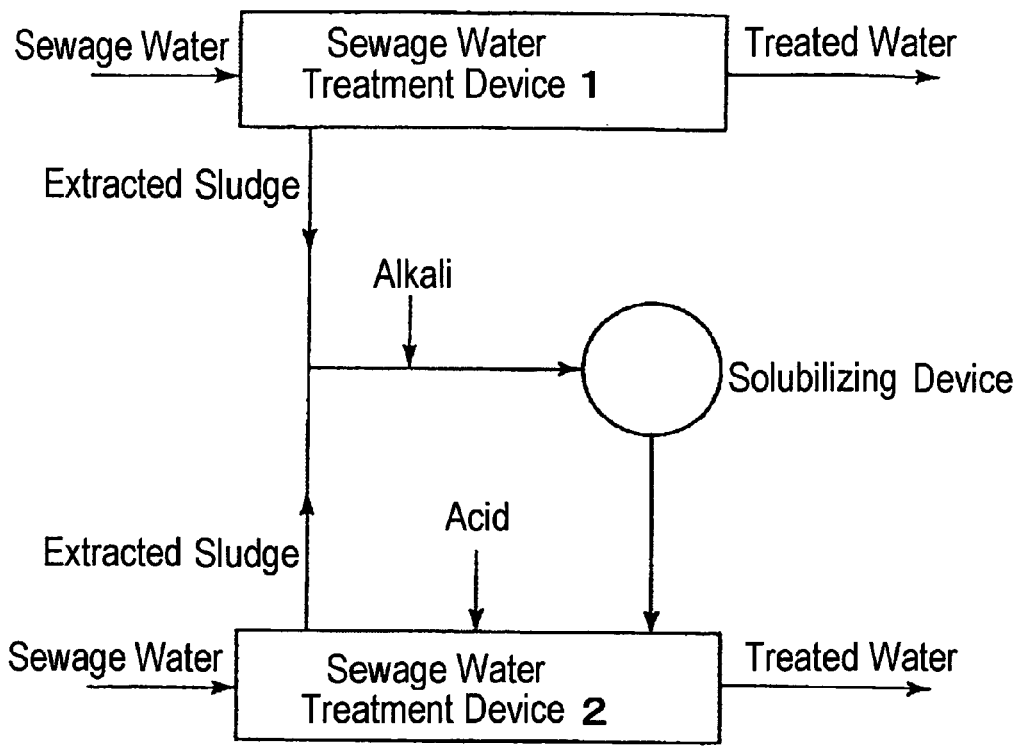
FIG. 10 shows a schematic structure of a further embodiment of the present invention.
Figure 11:
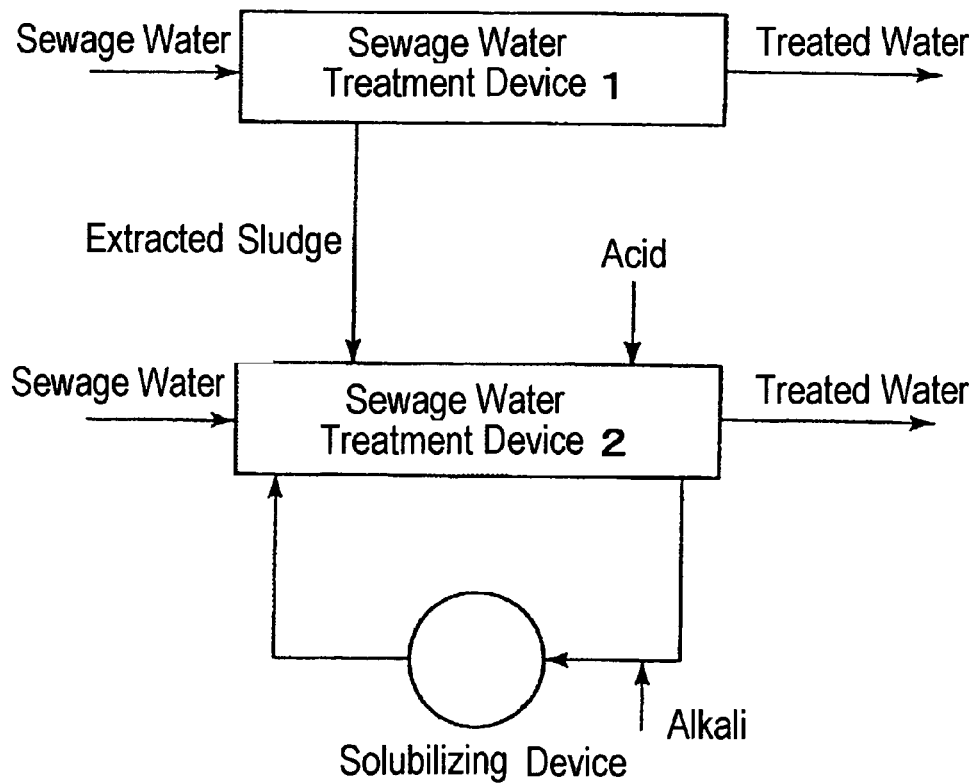
FIG. 11 shows a schematic structure of a further embodiment of the present invention.

With the use of the device, shown in FIG. 4, the re-converted sludge, subjected to biological oxidation treatment in the biological oxidizing treatment or in the aerating tank, may again be returned to the solubilizing tank. In this case, the thermal efficiency of heating treatment in the solubilizing device may be raised by exploiting waste heat generated by biological oxidation.

Any suitable combinations or various modifications of the above embodiments in a manner well-known to those skilled in the art may also be encompassed within the scope of the present invention. For example, extracted sludge from sewage water treatment equipment is transferred to at least one of a biological oxidizing tank for aerobic biological treatment, an anaerobic treatment tank for anaerobic biological treatment and an aerating tank alternately repeating aerobic treatment and anaerobic treatment at stated intervals. At least a fraction of re-converted sludge or re-re-converted sludge in each tank is adjusted to pH of 8 to 14 and solubilized to yield liquefied sludge, which liquefied sludge is injected into the aforementioned at least one of the tanks, inclusive of the sewage water treatment equipment, where the liquefied sludge is adjusted to the pH of from 5 to 9. At least a fraction of the re-converted sludge or re-re-converted sludge in the tank in question is adjusted to the pH of 8 to 14 and liquefied by liquefaction treatment to yield liquefied sludge, which liquefied sludge is directly or indirectly transferred to at least one of the aforementioned tanks, inclusive of the sewage water treatment equipment, where it is adjusted to the pH of from 5 to 9. Alternatively, the extracted sludge is adjusted to the pH of 8 to 14 and solubilized to yield liquefied sludge which is then directly or indirectly injected into the aforementioned at least one of the aforementioned tanks, inclusive of the sewage water treatment equipment, where it is adjusted to the pH of from 5 to 9. At least a fraction of re-converted sludge or re-re-converted sludge in the tank in question is extracted and has its pH adjusted to 8 to 14 to yield solubilized liquefied sludge, which liquefied sludge is directly or indirectly transferred to at least one of the aforementioned tanks, where it is adjusted to the pH of from 5 to 9. The above reduces the volume of sludge. The above re-converted sludge or re-re-converted sludge in the tank in question is transferred between the respective tanks, including the sewage treatment equipment, so that treated water may be allowed to outflow from at least one of the aforementioned tanks and the sewage water treatment equipment.

EXAMPLE 1

Figure 12:
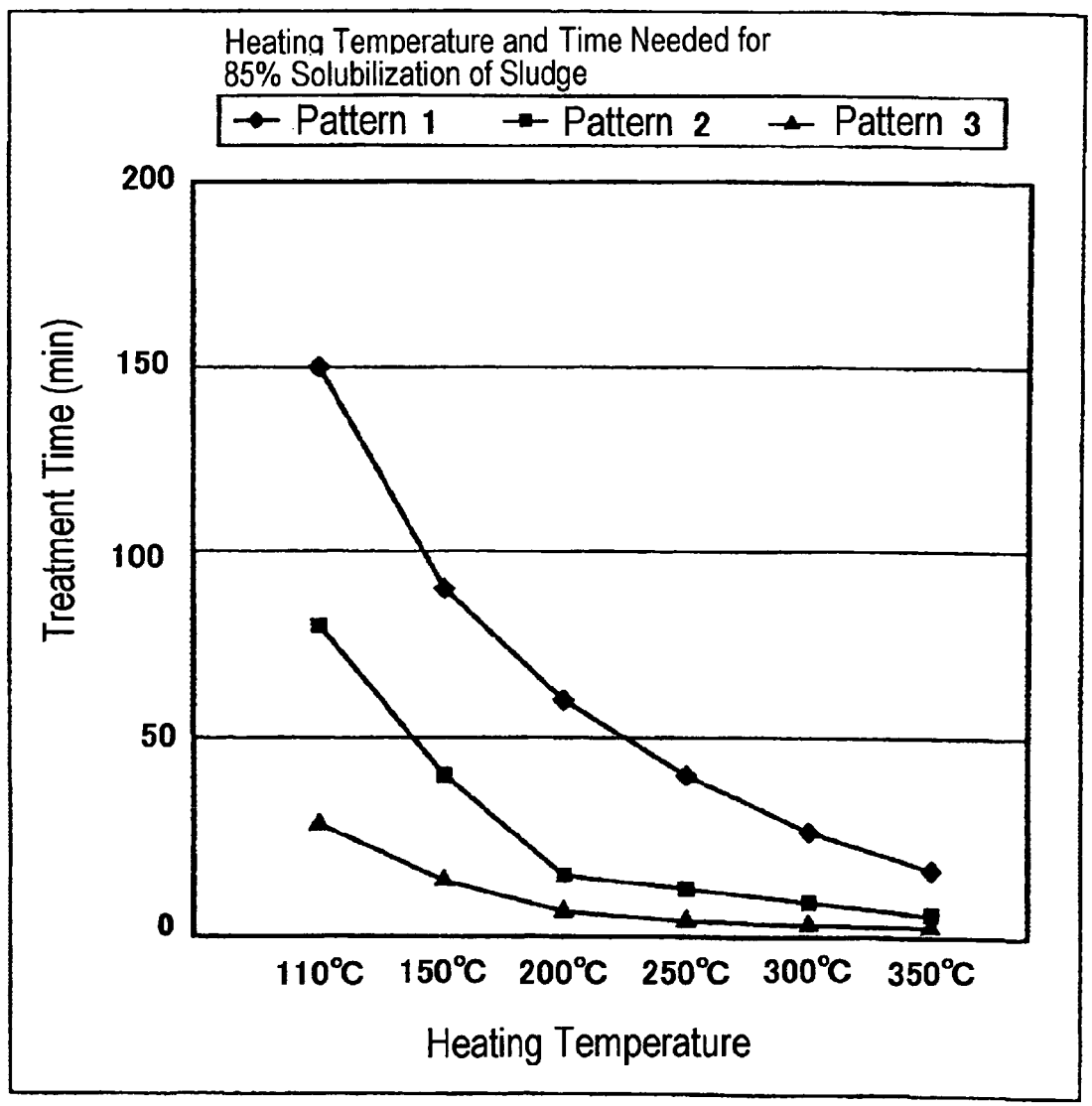
FIG. 12 is a graph showing the relation between the heating temperature and time for 85% solubilizing of sludge.

The following Example demonstrates the effect of the temperature, pressure and pH on the rate of sludge solubilization. FIG. 12 shows the relation between the treatment temperature and time needed in 85% solubilization of sludge with organic sludge concentration of 10,000 mg/L in case the sludge is solubilized by heat and pulverizing treatment (pattern 1), by heat and alkali treatment (pattern 2) and by heat, alkali, and pressure treatment (pattern 3). The solubilizing treatment of the pattern 1 is a method comprising heating the sludge, without pH adjustment, that is, at pH 7, by a solubilizing device, and pulverizing the sludge by expansion on depressurization produced in ejecting the heated sludge to outside the solubilizing device under the saturated steam pressure at the heating temperature. The solubilizing treatment of the pattern 2 is a method comprising adjusting the pH of the sludge by alkali, solubilizing the sludge by heating it under saturated steam pressure by a solubilizing device and releasing the resulting solubilized sludge on decreasing the pressure in the solubilizing device to an atmospheric pressure. The solubilizing treatment of the pattern 3 is a method comprising adjusting the pH of the sludge by alkali, heating the sludge by a solubilizing device at a pressure higher than the saturated steam pressure and releasing the so heated sludge on decreasing the pressure in the solubilizing device to an atmospheric pressure. In the patterns 2 and 3, alkali treatment was carried out so that the pH will be equal to 14. In the pressurizing treatment in the pattern 3, it is sufficient to apply a pressure higher than the saturated steam pressure, up to a temperature of 110° C. to 250° C., so that no vapor phase reaction will take place. For temperatures higher than 250° C., the ion product of water begins to be lowered appreciably with rise in temperature. Thus, for a temperature of 250° C. to 350° C., the pressure was applied such as to maintain the maximum ion product of water. Specifically, while the saturated steam pressures for 110° C., 150° C., 200° C., 250° C., 300° C. and 350° C. are 0.145 MPa, 0.49 MPa, 1.65 MPa, 4.3 MPa, 9.4 MPa and 18 MPa, the pressures of 0.2 MPa, 0.6 MPa, 2 MPa, 5 MPa, 35 MPa and 69 MPa were applied in the pattern 3 for the respective temperatures. In the present embodiment, the method comprising solubilizing the sludge by heating the sludge under subcritical conditions as disclosed in the JP Patent Kokai JP-A-2000-218215 is omitted here because the method is lower in the sludge solubilizing effect than the solubilizing treatment method of pattern 1 comprising heating followed by pulverization.

It may be seen from FIG. 12 that, in treating the sludge by heat and pulverizing treatment in the pattern 1, the treatment time of 150 minutes is needed at 110° C. for solubilizing the sludge of 10000 mg/L by 85%, whereas, in treatment with the pattern 2, the treatment time could be shortened to 80 minutes by carrying out alkali treatment in addition to the heat treatment. In the pattern 3, in which the pressure treatment is further carried out, the treatment time for 85% solubilization was 27 minutes, which represents reduction by ca. one-fifth that of the pattern 1 and ca. one-third that of the pattern 2. For each pattern, the treatment time becomes shorter with rise in temperature. Nevertheless, the treatment time of 15 minutes and the treatment time of 35 minutes are needed for 85% solubilization, even at 350° C., with the patterns 1 and 2, respectively, while the 85% solubilization of sludge may be achieved in 9 seconds with the pattern 3. Thus, it is seen that, by the treatment comprising the combination of heating treatment, pressurizing treatment and alkali treatment, the treatment time may be reduced appreciably with marked favorable effects.

EXAMPLE 2

Figure 13:
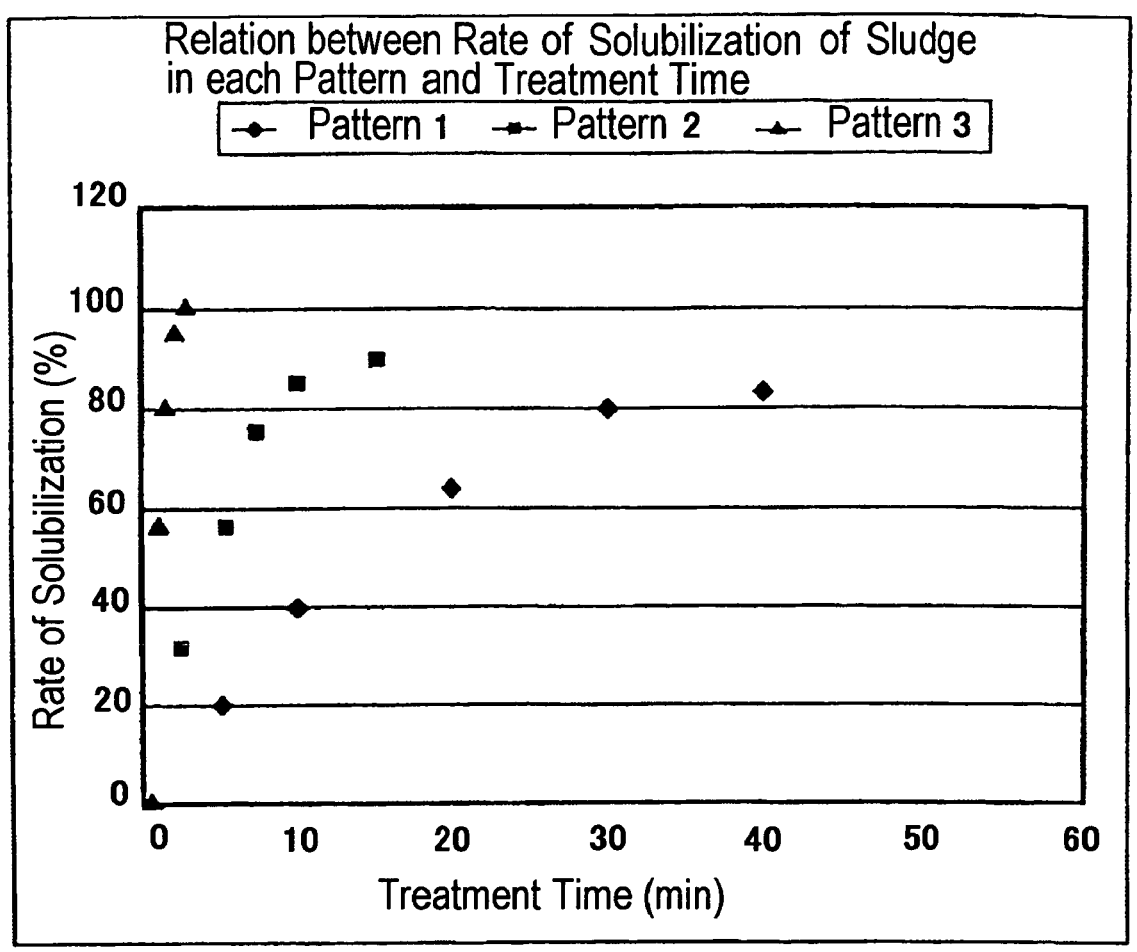
FIG. 13 is a graph showing the relation between the solubilizing rate of sludge solubilizing and processing time.

The following Example shows the relation between the rate of solubilization and the treatment time for solubilizing the sludge. FIG. 13 shows the relation between the rate of solubilization and the treatment time for the sludge with organic sludge content of 10,000 mg/L, in case the sludge treatment is carried out by heat and pulverizing treatment (pattern 1), heat and alkali treatment (pattern 2) and heat, alkali and pressure treatment (pattern 3). The inorganic content in the sludge is disregarded. The heating temperature was set to 250° C., and the pH value of sludge was set to 14 for the alkali treatment for the patterns 2 and 3. The saturated steam pressure was used for the treatment with the patterns 1 and 2, while the pressurizing treatment with the pattern 3 was carried out under a pressure of 5 MPa higher than the saturated steam pressure of 4.3 MPa for 250° C.

As may be seen from FIG. 13, 85% solubilization could be achieved by the treatment of ca. 40 minutes, for the pattern 1, and 90% solubilization could be achieved by the treatment of ca. 15 minutes, for the pattern 2, whereas, with the pattern 3, 100% solubilization could be achieved in ca. 2 minutes. For 100% solubilization, the content of measly amounts of the organic matter is allowable. With the patterns 1 and 2, the solubilizing rate is hardly raised even if treatment is continued further, such that 100% solubilization was that difficult to achieve, presumably because significant amounts of oxides are generated as by-products with the solubilizing treatment under the saturated steam pressure due to the effect of the vapor phase reaction. Thus, for efficient complete sludge solubilization in short time, it is crucial to suppress the vapor phase reaction, by the combination of the heating treatment, alkali treatment and pressurizing treatment, and to effect hydrolysis in the liquid phase reaction.

EXAMPLE 3

Figure 14:
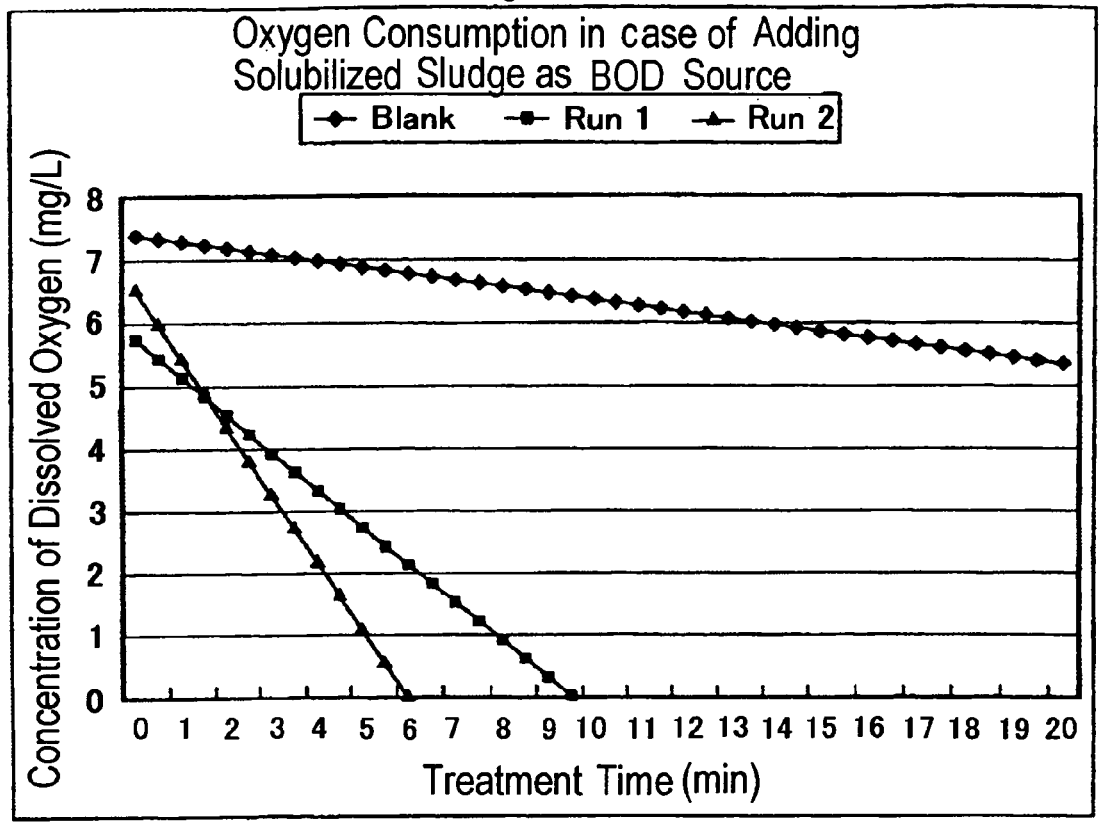
FIG. 14 is a graph showing oxygen consumption in case solubilized sludge is added as a BOD source to activated sludge.

In the following Example, biodegradability of solubilized sludge was scrutinized from changes in the amount of oxygen consumption of activated sludge in case the solubilized sludge has been added to the activated sludge as a BOD source. In Run 1, sludge solubilized by heat and alkali treatment was solid-liquid separated and only the liquid part free of solid content was used as a BOD source. In Run 2, the liquid part of sludge, solubilized by ca. 100% by the heat, alkali and pressure treatment, was added as a BOD source. In both Run 1 and Run 2, the BOD source was added in an amount such that the dry weight of sludge prior to solubilization accounts for 0.1 times the dry weight of activated sludge. Specifically the heating temperature was set to 200° C., the pH by alkali addition was set to 14, and the heating time was set to 15 minutes. In the Run 1, treatment was carried out under a saturated steam pressure of 1.65 MPa and, in the Run 2, solubilized sludge, treated at 2 MPa, higher than the saturated steam pressure, was added to activated sludge of 500 mg of dry weight so that pre-solubilization dry weight is 50 mg as compared to the activated sludge of 500 mg of dry weight. The sludge not added with the BOD source was labeled Blank. The results are shown in FIG. 14. The amount of oxygen consumption is inversely proportionate to the concentration of dissolved oxygen.

As may be seen from FIG. 14, if solubilized sludge is added as BOD source, the concentration of dissolved oxygen is decreased, with the amount of oxygen concentration of the activated sludge increasing significantly. It is because activated sludge absorbs solubilized sludge as substrate and consumes oxygen in the course of metabolic degradation. It is seen that solubilized sludge undergoes metabolic degradation by activated sludge. The amount of oxygen consumption is increased on addition of solubilized sludge by heat, alkali and pressure treatment, as compared to the case of adding solubilized sludge by heat and alkali treatment. Comparison of the rate of oxygen consumption per unit has revealed that the rates of oxygen consumption of the Blank, Run 1 and Run 2 are ca. 0.1 mgO$_2$/L min, ca. 0.6 mgO$_2$/L min and ca. 1.1 mgO$_2$/L min, respectively, with the rate of oxygen consumption of Run 2 being ca. 11 times that of the Blank and ca. twice that of Run 1. This indicates that sludge can be solubilized to the state of lower molecular weight with heat, alkali and pressure treatment of the present invention than with heat and alkali treatment, and that the higher the rate of degradation of solubilized sludge, the more is the effect for reducing the sludge volume, and hence the heat, alkali and pressure treatment of the present invention is particularly effective in reducing the sludge volume.

EXAMPLE 4

In the following, comparison is made between the heat and pulverizing treatment (pattern 1), heat and alkali treatment (pattern 2) and the heat, alkali and pressure treatment of the present invention (pattern 3) to indicate the tremendous effect of the present invention in reducing the sludge volume. The following preliminary experiment was carried out first in order to find the maximum load factor of the activated sludge with solubilized sludge of each pattern. The maximum load factor herein means the maximum load ratio for which the quality of treated water is not worsened as compared to that prior to start of the experiment in which solubilized sludge is loaded on the activated sludge and the resulting mass is then aerobically treated for 24 hours. Specifically, the maximum load factor is represented by the ratio of the dry weight of the sludge prior to the solubilizing treatment to the dry weight of the activated sludge. In the preliminary experiment, as a vessel charged with activated sludge of ca. 10 kg of dry weight is aerated, a preset amount of sludge was taken out, solubilized and returned into the vessel to carry out an aerobic treatment. Experiments were conducted on plural lines so that the load factor of the solubilized sludge amounts to 0.01/day to 0.5/day. As solubilizing conditions, the heating temperature was set to 200° C., and the pH values of sludge for alkaline treatment in the patterns 2 and 3 were adjusted to 14. While the treatment for the patterns 1 and 2 was carried out at ca. 1.65 MPa, as the saturated steam pressure at 200° C., treatment for the pattern 3 was carried out at a pressure of 2 MPa higher than the saturated steam pressure. The sludge heating time was set to ca. one hour, 20 minutes and 6 minutes, for the patterns 1, 2 and 3, in order to give the maximum solubility rate for the respective patterns. The solubility rate for this case was 85%, 90% and 100% for the patterns 1, 2 and 3, respectively. When the sludge is stated to be solubilized by 100%, there may be contained a measly amount of an organic matter in the sludge. As a result, it was seen that the maximum load factors for the patterns 1, 2 and 3 were ca. 0.05/day (0.48 kg/day), 0.07/day (0.65 kg/day) and 0.4/day (2.9 kg/day), respectively. It was also seen that the sludge volume was decreased by ca. 0.127 g, ca. 0.189 g and ca. 0.86 g per day for the patterns 1 to 3, respectively, for the maximum load factor in the respective patterns.

Figure 15:
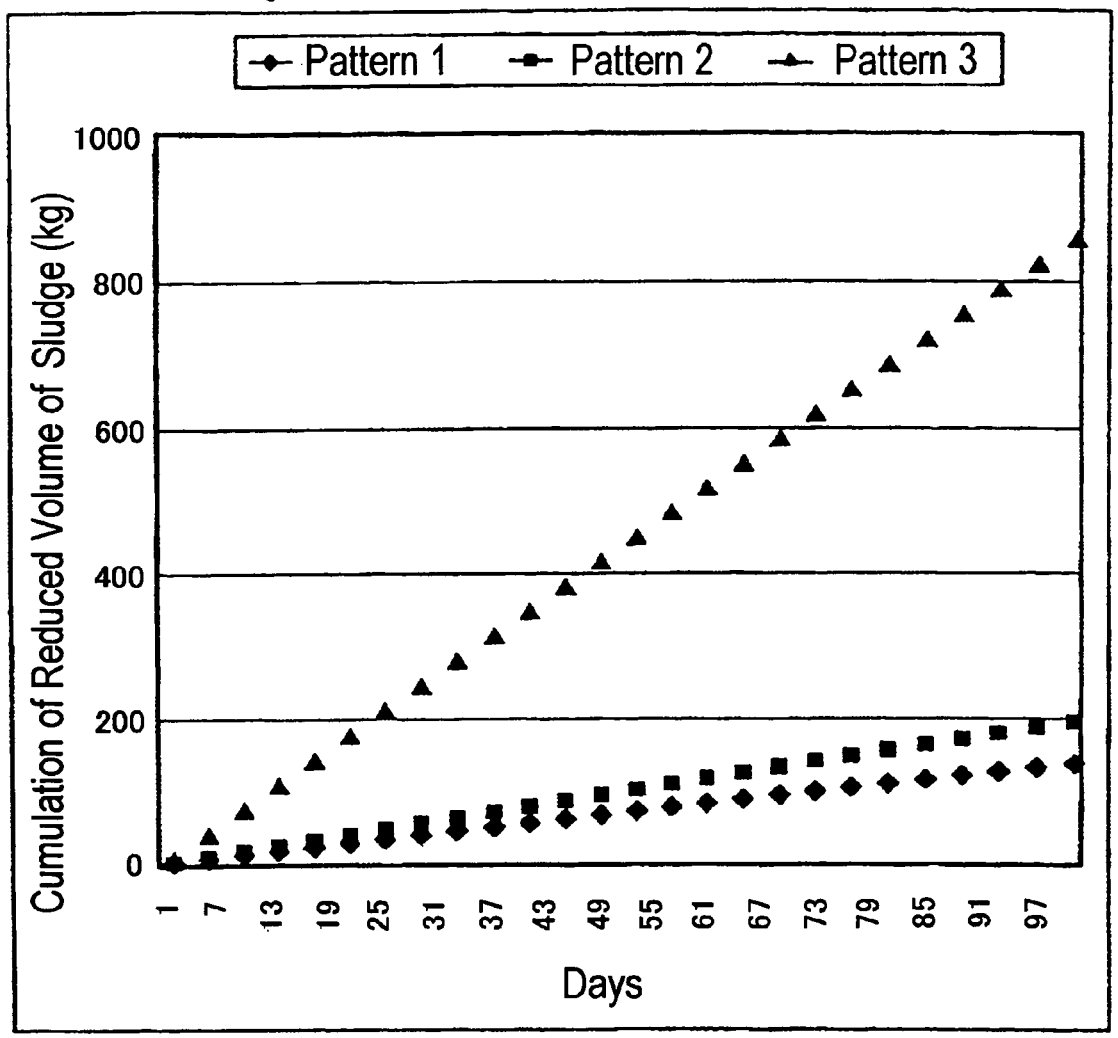
FIG. 15 is a graph showing the relation between accumulation of reduced-volume sludge and the number of days of treatment.

Based on the above results, further scaled-up validating experiments were conducted. Sludge was charged into a biological oxidizing tank so that the dry weight of the organic sludge was 100 kg. The sludge so charged was then aerated. The sludge was taken out in preset amounts from the biological oxidizing tank each day and solubilized in accordance with the methods of the respective patterns. The so solubilized sludge was returned to the biological oxidizing tank and treated biologically. The preset amounts of sludge taken out from the biological oxidizing tank for solubilizing treatment were set to ca. 4.8 kg, ca. 6.5 kg and ca. 29 kg, for the patterns 1, 2 and 3, based on the results of the preliminary experiments. Based on the results of volume reduction of the preliminary experiments, sludge generated from other tank(s) were supplied each day, as excess sludge, in amounts of ca. 1.2 kg, ca. 1.9 kg and ca. 8.6 kg, for the patterns 1, 2 and 3, respectively. The treated water was solid-liquid separated by a membrane type filtration device provided in the biological oxidizing tank and allowed to outflow as efflux water. The solubilizing conditions for the respective patterns used, namely the temperature, pressure and treatment time, were the same as those of the preliminary experiments. The validating experiments were conducted under the above-defined conditions. The cumulative volume of the sludge supplied during the experimental periods from the other tank(s) as excess sludge into the biological oxidizing tank, that is, the sludge reduced in volume in the biological oxidizing tank, is shown in FIG. 15.

As a result, such an operation could be realized that the volume of sludge in the biological oxidizing tank is not increased under the maximum load factors of the respective patterns and the quality of treated water from the biological oxidizing tank was not aggravated. It is seen from FIG. 15 that the sludge volume decreasing effect of the pattern 3 is higher than that of the other two patterns. Specifically, the sludge volume decreasing effect of the pattern 3 was 7 times that of the pattern 1 and 4.5 times that of the pattern 2. The reason is that sludge has substantially completely been solubilized by the heat, alkali and pressure treatment and promptly metabolically degraded by the sludge contained in the biological oxidizing tank.

EXAMPLE 5

An Example demonstrating an economical efficacy of the present invention is now explained. Comparison was made of the running costs needed for reducing the volume of the excess sludge of 100 kg (dry weight)/day, for the sludge re-converting rate of 0.7, for the cases of using heat and pulverizing treatment (pattern 1), heat and alkali treatment (pattern 2) and heat, alkali and pressure treatment (pattern 3). Comparison was also made of the initial costs of the patterns 1 and 3. With the patterns 1 and 2, the higher the moisture content, the lower becomes the rate of solubilization, under the effect of the vapor phase reaction. Hence, the concentration of the excess sludge being solubilized was set to 10,000 mg/L. On the other hand, with the pattern 3, in which not only a sufficient quantity of alkali, as a catalyst of the hydrolytic reaction, is added, but also the sludge is pressurized at a pressure higher than the saturated steam pressure, the liquid phase becomes the main reaction field, the capability of hydrolysis becomes strong and the generation of oxides may be suppressed. Hence, the concentration of the excess sludge being solubilized was set to 50,000 mg/L. With the pattern 3, 100% solubilization is possible, while such is not possible with the patterns 1, 2. Hence, comparison was made of the above treatment condition for the pattern 3 with the treatment condition for the pattern 1 with 85% solubilization and that for the pattern 2 with 90% solubilization. It is noted that, with the case of 100% solubilization, there may be contained a miniscule quantity of the organic matter. The heat treatment with the patterns 1, 2 and 3 was carried out at 250° C. With the patterns 2 and 3, the pH was adjusted to 14 and, with the pattern 3, the pressure for the pressure treatment was set to 5 MPa.

The following Table 1 shows the rates of solubilization for the respective patterns, and the values of the capacity needed for the solubilizing device as found from the time for solubilization until the rates of solubilization are reached. The operating time of the solubilization device is 24 hours/day.

TABLE 1

| | Rate of Solubilization (%) | Treatment time (min) | Capacity (L) |
|---|---|---|---|
| Pattern 1 | 85 | 40 | 950 |
| Pattern 2 | 90 | 15 | 350 |
| Pattern 3 | 100 | 2 | 9 |

It is noted that, with the pattern 3, the concentration of the sludge being solubilized can be five times that with the patterns 1 and 2, so that the amount of the sludge solution supplied to the solubilizing device as described above can be reduced to approximately one-fifth. In addition, as may be seen from Table 1, the treatment time for the pattern 3 until the solubilization rate of 100% was reached is approximately two minutes, in comparison with the treatment time for the pattern 1 of approximately 40 minutes until the solubilization rate of 85% was reached and with the treatment time for the pattern 2 of approximately 15 minutes until the solubilization rate of 90% was reached. This treatment time of 2 minutes is as short as 1/20 of that for the pattern 1 and 1/7.5 of that for the pattern 2. From the difference in the concentration of the excess sludge being solubilized and from the difference in the solubilization time, the capacity of the solubilization device of the pattern 3 could be reduced to approximately 1/106 and approximately 1/39 of that of the pattern 1 and the pattern 2, respectively.

Table 2 below shows the effective capacity of the biological oxidizing tank, as found from the maximum loading factor of activated sludge with solubilized sludge, under such a state in which the amount of the sludge in the biological oxidizing tank is not increased and in which the BOD in the treated water is not aggravated. This effective capacity was found by calculations based on the data of the preliminary test that the loading factor for which the activated sludge is capable of degrading the biodegradation-resistant undegraded sludge, that is, sludge that remained undegraded by the solubilizing treatment, is approximately 0.007/day. The loading factor of 0.007/day means that, in case the undegraded sludge is loaded on the sludge in the biological oxidizing tank to a loading factor higher than 0.007/day, the sludge in the biological oxidizing tank is unable to degrade the undegraded sludge, such that, due to accumulation of the undegraded sludge, the quantity of the sludge in the biological oxidizing tank is increased.

TABLE 2

|  | Loading factor (/day) | Effective capacity(m$^3$) |
|---|---|---|
| Pattern 1 | 0.047 | 715 |
| Pattern 2 | 0.07 | 476 |
| Pattern 3 | 0.4 | 83 |

As may be seen from Table 2, the loading factors for the patterns 1 and 2 are 0.047 and 0.07, respectively, while that of the pattern 3 may be 0.4, so that the capacity of the biological oxidizing tank of the pattern 3 may be reduced to approximately ⅛.6 and approximately ⅕.7 of those for the patterns 1 and 2.

The results of Tables 1 and 2 indicate that, with the pattern 3, according to the present invention, as compared to the sludge treatment for the patterns 1 and 2, the solubilizing device and the biological oxidizing tank may be appreciably reduced in size, and hence the initial cost needed for sludge treatment can be decreased significantly. More specifically, the initial cost, including that of all of the devices needed for reducing the sludge volume, including e.g., the sludge volume reducing device and the biological oxidizing tank, may roughly be estimated to be 200,000,000 yen for the pattern 1, while that for the pattern 3 is ca. 50,000,000 yen, indicating that the sludge volume reducing device according to the present invention may be extremely inexpensive as compared to that of the conventional sludge volume reducing device.

Table 3 shows running costs needed for reducing the sludge volume as found from the respective patterns. It is assumed that waste heat of the solubilized high-temperature sludge emanating from the solubilizing device has been subjected to waste heat exchange with the sludge to be sent to the solubilizing device next in order to pre-heat the sludge about to be solubilized.

TABLE 3

|  | Pattern 1 | Pattern 2 | Pattern 3 |
|---|---|---|---|
| Cost for chemicals | ¥ 0 | ¥ 7,684 | ¥ 5,123 |
| Cost of power for pump | ¥ 6,660 | ¥ 9,360 | ¥ 363 |
| Cost of power for boiler | ¥ 2,165 | ¥ 2,028 | ¥ 413 |
| Cost of power for aeration | ¥ 12,248 | ¥ 8,730 | ¥ 2,944 |
| Cost for fuel | ¥ 14,370 | ¥ 14,340 | ¥ 2,850 |
| Sum(/day) | ¥ 35,443 | ¥ 42,142 | ¥ 11,693 |

As shown in Table 3, in Pattern 1, no pH adjustment is conducted, so that there is no cost involved in chemicals. However, the installation is large and the treatment time is protracted, so that power costs for e.g., pumps, and fuel costs, are high. In the pattern 2, in which the sludge to be solubilized cannot be condensed and raised in concentration, the costs involved in the chemicals are high, as a result of which the running costs are higher than the pattern 1. With the pattern 3 in contrast, in which the sludge to be solubilized can be condensed at five times higher concentration, the costs involved in the chemicals are lower than with the pattern 2, whilst the power costs for pumps and boilers and fuel costs are appreciably lower than with the patterns 1 and 2. Moreover, since the capacity of the biological oxidizing tank is small, power costs for aeration are low, such that, in a sum total, the running costs for the pattern 3, is ⅓ and ⅓.6 of those of the patterns 1 and 2, respectively. The cost involved in dewatering the sludge into a cake for disposal as industrial waste in the conventional practice is ca. 200 yen per kg, while the cost for reducing the same volume of sludge by the pattern 3 are 117 yen. Thus, it may be seen that sludge volume reduction by the method and the apparatus of the present invention may be carried out at an extremely low cost.

INDUSTRIAL APLICABILITY

With the sludge volume reducing method according to the present invention, organic sludge may be liquefied sufficiently and the so liquefied sludge may further be metabolically degraded. Thus, the method may be introduced into the organic sewage water disposal system to provide a sewage water treatment system where there is generated no organic sludge waste, so that marked contribution may be expected to be achieved towards reducing the volume of industrial wastes.

The invention claimed is:

1. A method for reducing the volume of sludge comprising the steps of:
   taking out at least a fraction of sludge from a biological oxidizing tank, receiving a sludge from a sewage water treatment device, said sludge being generated by aerobic treatment of an organic sewage water in the sewage water treatment device;
   adjusting the pH of said taken out sludge to 8 to 14;
   heating the pH-adjusted sludge to 110° C. to 250° C. at a pressure equal to or higher than saturated steam pressure to solubilize the sludge to a state readily degradable by microorganisms;
   returning a preset amount of the solubilized sludge into said biological oxidizing tank; and
   adjusting the pH of the sludge in said biological oxidizing tank to 5 to 9.

2. A method for reducing the volume of sludge comprising the steps of:
   adjusting the pH of a sludge extracted from a sewage water treatment device, to a pH of 8 to 14;
   heating said extracted sludge, to 110° C. to 250° C. at a pressure equal to or higher than saturated steam pressure to solubilize the sludge to a state readily degradable by microorganisms;
   injecting a preset amount of the solubilized extracted sludge into a biological oxidizing tank, configured for degrading the solubilized extracted sludge by aerobic treatment; and
   adjusting the pH of the sludge in said biological oxidizing tank to 5 to 9.

3. A method for reducing the volume of sludge comprising the steps of:
   adjusting the pH of a sludge extracted from a sewage water treatment device, to a pH of 8 to 14;
   heating said extracted sludge, to 110° C. to 250° C. at a pressure equal to or higher than saturated steam pressure to solubilize the sludge to a state readily degradable by microorganisms;

injecting a preset amount of the solubilized extracted sludge into a biological oxidizing tank, configured for degrading the solubilized extracted sludge by aerobic treatment;

adjusting the pH of the sludge in said biological oxidizing tank to 5 to 9;

taking out at least a fraction of re-converted sludge being generated by aerobic treatment of said solubilized extracted sludge in said biological oxidizing tank; and returning the extracted re-converted sludge to said step of adjusting the pH of the sludge to 8 to 14.

4. A method for reducing the volume of sludge comprising the steps of:

taking out at least a fraction of sludge as extracted sludge from a sewage water treatment device, configured for degrading organic sewage water by biological treatment;

adjusting the pH of said taken out extracted sludge to 8 to 14;

heating the pH-adjusted extracted sludge to 110° C. to 250° C. at a pressure equal to or higher than saturated steam pressure to solubilize the sludge to a state readily degradable by microorganisms;

injecting a preset amount of the solubilized extracted sludge into a biological oxidizing tank, configured for degrading the solubilized extracted sludge by aerobic treatment;

adjusting the pH of the sludge in said biological oxidizing tank to 5 to 9;

taking out at least a fraction of re-converted sludge from said biological oxidizing tank; and returning said taken out re-converted sludge to said sewage water treatment device.

5. A method for reducing the volume of sludge comprising the steps of:

taking out at least a fraction of sludge as extracted sludge from a sewage water treatment device, configured for degrading organic sewage water and solubilized extracted sludge by biological treatment;

adjusting the pH of said taken out extracted sludge to 8 to 14;

heating the pH-adjusted extracted sludge to 110° C. to 250° C. at a pressure equal to or higher than saturated steam pressure to solubilize the sludge to a state readily degradable by microorganisms;

returning a preset amount of said solubilized extracted sludge to said sewage water treatment device; and adjusting the pH of the sludge in said sewage water treatment device to 5 to 9.

6. A method for reducing the volume of sludge comprising the steps of:

taking out at least a fraction of sludge as extracted sludge from a sewage water treatment device 1, configured for degrading organic sewage water by a biological treatment;

adjusting the pH of said taken out extracted sludge to 8 to 14;

heating the pH-adjusted extracted sludge to 110° C. to 250° C. at a pressure equal to or higher than saturated steam pressure, to solubilize the sludge to a state readily degradable by microorganisms;

injecting a preset amount of the solubilized extracted sludge into a sewage water treatment device 2, configured for degrading organic sewage water and solubilized extracted sludge by biological treatment;

adjusting the pH of sludge in said sewage water treatment device 2 to 5 to 9;

taking out at least a fraction of sludge as extracted sludge from said sewage water treatment device 2; and returning said taken out extracted sludge to said step of adjusting the pH of the taken out extracted sludge to 8 to 14.

7. A method for reducing the volume of sludge comprising the steps of:

taking out at least a fraction of sludge as extracted sludge from a sewage water treatment device 1, configured for degrading organic sewage water by biological treatment;

injecting said taken out extracted sludge into a sewage water treatment device 2, configured for degrading the organic sewage water and solubilized extracted sludge by biological treatment;

extracting at least a fraction of sludge as extracted sludge from said sewage water treatment device 2;

adjusting the pH of said taken out extracted sludge to 8 to 14;

heating the pH-adjusted extracted sludge to 110° C. to 250° C. at a pressure equal to or higher than saturated steam pressure to solubilize the sludge to a state readily degradable by microorganisms;

returning a preset amount of the solubilized extracted sludge to said sewage water treatment device 2; and adjusting the pH of the sludge in said sewage water treatment device 2 to 5 to 9.

8. The method for reducing the volume of sludge as defined in any one of claims 1-3 and 4-7, wherein said solubilized extracted sludge or said re-converted sludge is returned or injected into an anaerobic treatment device, configured for degrading said solubilized extracted sludge or re-converted sludge by anaerobic treatment, or into an intermittent aerating tank alternately carrying out aerobic treatment and anaerobic treatment, instead of into at least one of said biological oxidizing tank, and said sewage water treatment device.

9. The method for reducing the volume of sludge as defined in any one of claims 1-3 and 4-7, wherein phosphorus and/or nitrogen is removed from said solubilized extracted sludge, said re-converted sludge.

10. The method for reducing the volume of sludge as defined in any one of claims 1-3 and 4-7, wherein the adjustment of pH of from 8 to 14 is by addition of alkali.

11. The method for reducing the volume of sludge as defined in claim 10, wherein the alkali is sodium hydroxide.

12. The method for reducing the volume of sludge as defined in any one of claims 1-3 and 4-7, wherein the solid content in said solubilized extracted sludge or said solubilized re-converted sludge is separated before returning or injection into said biological oxidizing tank, or said sewage water treatment device, so that only liquid content is returned or injected.

13. The method for reducing the volume of sludge as defined in claim 12, wherein the separated solid content is returned to the step of solubilizing the extracted sludge or solubilized re-converted sludge, adjusted to the pH of 8 to 14, to a state readily degradable by microorganisms by heating to 110° C. to 250° C. at a pressure equal to or higher than saturated steam pressure.

14. The method for reducing the volume of sludge as defined in any one of claims 1-3 and 4-7, wherein at least a fraction of said solubilized extracted sludge or said solubilized re-converted sludge is allowed to outflow as an efflux.

15. The method for reducing the volume of sludge as defined in any one of claims 1-3 and 4-7, wherein said solubilized extracted sludge, said solubilized re-converted sludge is degraded on oxidation by an oxidizing agent or by a photocatalyst.

16. The method for reducing the volume of sludge as defined in any one of claims 1-3 or and 4-7, wherein said solubilized extracted sludge said solubilized re-converted sludge is flocculated/precipitated with a flocculant.

17. The method for reducing the volume of sludge as defined in claim 15, wherein at least a fraction of the solubilized sludge, oxidized or flocculated and precipitated, is allowed to outflow as an efflux.

18. The method for reducing the volume of sludge as defined in any one of claims 1-3 and 4-7, wherein at least a fraction of the solubilized extracted sludge or said solubilized re-converted sludge is taken out, the pH of said taken out sludge is adjusted to 8 to 14, the pH-adjusted sludge is heated to 110° C. to 250° C. to a pressure equal to or higher than the saturated steam pressure, concurrently with solubilizing by ultrasonic treatment to a state readily degradable by microorganisms, and wherein a preset amount of the solubilized extracted re-converted sludge is returned to said biological oxidizing tank, said sewage water treatment device, said anaerobic treatment device or to said intermittent aerating tank, as the pH of the sludge in said tank or device is adjusted to 5 to 9.

19. A sludge volume reducing method comprising the steps of:

heating the extracted sludge, adjusted to a pH of 8 to 14, to 110° C. to 250° C. at a pressure equal to or higher than the saturated steam pressure, to solubilize the sludge to a state readily degradable by microorganisms;

injecting a preset amount of the solubilized extracted sludge into a biological oxidizing tank, configured for degrading the extracted sludge by aerobic treatment;

adjusting the pH of the sludge in said biological oxidizing tank to 5 to 9;

taking out at least a fraction of the re-converted sludge from said biological oxidizing tank;

injecting said taken out re-converted sludge into an anaerobic treatment tank configured for degrading said taken out re-converted sludge by anaerobic treatment;

taking out at least a fraction of re-re-converted sludge from said anaerobic treatment tank; and returning said taken out re-re-converted sludge into the biological oxidizing tank.

* * * * *